United States Patent
Han et al.

(10) Patent No.: US 11,647,885 B2
(45) Date of Patent: May 16, 2023

(54) ROBOT VACUUM CLEANER AND CLEANING ROUTE PLANNING METHOD THEREOF

(71) Applicant: SAMSUNG ELECTRONICS CO., LTD., Suwon-si (KR)

(72) Inventors: Seungbeom Han, Suwon-si (KR); Junggap Kuk, Suwon-si (KR); Musik Kwon, Suwon-si (KR); Jinwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 16/702,012

(22) Filed: Dec. 3, 2019

(65) Prior Publication Data
US 2020/0178748 A1    Jun. 11, 2020

(30) Foreign Application Priority Data

Dec. 6, 2018   (KR) ......................... 10-2018-0156268

(51) Int. Cl.
*A47L 11/40* (2006.01)
*G05D 1/02* (2020.01)
*B25J 9/00* (2006.01)

(52) U.S. Cl.
CPC ....... *A47L 11/4011* (2013.01); *A47L 11/4038* (2013.01); *B25J 9/0003* (2013.01);
(Continued)

(58) Field of Classification Search
CPC ......... G05D 2201/0215; G05D 1/0238; G05D 1/0219; G05D 2201/0203; B25J 9/0003
See application file for complete search history.

(56) References Cited

U.S. PATENT DOCUMENTS 4,674,048 A     6/1987  Okumura
5,109,566 A  *  5/1992  Kobayashi .......... A47L 11/4011
                                                    15/340.1
(Continued)

FOREIGN PATENT DOCUMENTS

CN         104769962 A      7/2015
CN         107666846 A      2/2018
(Continued)

OTHER PUBLICATIONS

Korean Office Action dated Dec. 24, 2020 in corresponding Korean Patent Application No. 10-2018-0156268 (with translation).

(Continued)

*Primary Examiner* — Jeff A Burke
*Assistant Examiner* — Christopher A Buksa
(74) *Attorney, Agent, or Firm* — Nixon & Vanderhye P.C.

(57) ABSTRACT

A method, performed by a robot vacuum cleaner, of planning a cleaning route includes: dividing an indoor space into at least one cleanable region based on an indoor space map generated using at least one sensor included in the robot vacuum cleaner; dividing the at least one cleanable region into a plurality of partial regions based on a cleaning mode of the robot vacuum cleaner; and planning a first cleaning route to control a number of direction changes of the robot vacuum cleaner with respect to each of the plurality of partial regions based on the cleaning mode being a first mode.

16 Claims, 23 Drawing Sheets

(52) U.S. Cl.
CPC ......... *G05D 1/0219* (2013.01); *G05D 1/0238* (2013.01); *A47L 2201/04* (2013.01); *G05D 2201/0215* (2013.01)

(56) References Cited

U.S. PATENT DOCUMENTS

| | | | |
|---|---|---|---|
| 8,457,789 | B2 | 6/2013 | Hong et al. |
| 9,226,635 | B2* | 1/2016 | Kim .................... A47L 11/4061 |
| 9,364,128 | B2 | 6/2016 | Kim et al. |
| 9,456,725 | B2 | 10/2016 | Kim et al. |
| 10,488,857 | B2 | 11/2019 | Duffley et al. |
| 10,758,104 | B2 | 9/2020 | Schnittman et al. |
| 2005/0010331 | A1* | 1/2005 | Taylor .................. G05D 1/0274 318/568.12 |
| 2009/0182464 | A1 | 7/2009 | Myeong et al. |
| 2016/0302638 | A1 | 10/2016 | Haegermarck |
| 2017/0147000 | A1* | 5/2017 | Hoennige ........... A47L 11/4011 |
| 2017/0371341 | A1 | 12/2017 | Leinhos et al. |
| 2018/0049613 | A1 | 2/2018 | Tsuboi et al. |
| 2018/0284786 | A1 | 10/2018 | Kina-Martinson et al. |
| 2019/0025838 | A1 | 1/2019 | Artes et al. |
| 2019/0208978 | A1 | 7/2019 | Shitamoto et al. |

FOREIGN PATENT DOCUMENTS

| | | |
|---|---|---|
| JP | 11-212642 | 8/1999 |
| JP | 2000-60782 | 2/2000 |
| JP | 3598881 | 9/2004 |
| JP | 2018-533801 | 11/2018 |
| KR | 10-1995-0005403 | 5/1995 |
| KR | 10-1056935 | 8/2011 |
| KR | 20120055891 A | 6/2012 |
| KR | 10-1476448 | 12/2014 |
| KR | 10-2015-0009048 | 1/2015 |
| KR | 10-1634518 | 6/2016 |
| KR | 10-1677634 | 11/2016 |
| KR | 10-1752190 | 6/2017 |
| KR | 10-2018-0015928 | 2/2018 |
| WO | 2018-043180 | 8/2018 |

OTHER PUBLICATIONS

International Search Report and Written Opinion dated Mar. 23, 2020 in counterpart International Application No. PCT/KR2019/017068.
Korean Office Action dated Jun. 23, 2021 in corresponding Korean Patent Application No. 10-2018-0156268.
Extended European Search Report and Written Opinion dated Aug. 16, 2021 in corresponding European Application No. 19893167.7.
Korean Decision to Refuse dated Dec. 7, 2021 for KR Application No. 10-2018-0156268.
Korean Notice of Amendment Dismissal dated Jan. 26, 2022 for KR Application No. 10-2018-0156268.
Chinese Office Action dated Jan. 19, 2022 for CN Application No. 201980079752,2.
Korean Office Action dated Nov. 15, 2022 for KR Application No. 10-2022-0023882.

\* cited by examiner

FIG. 1
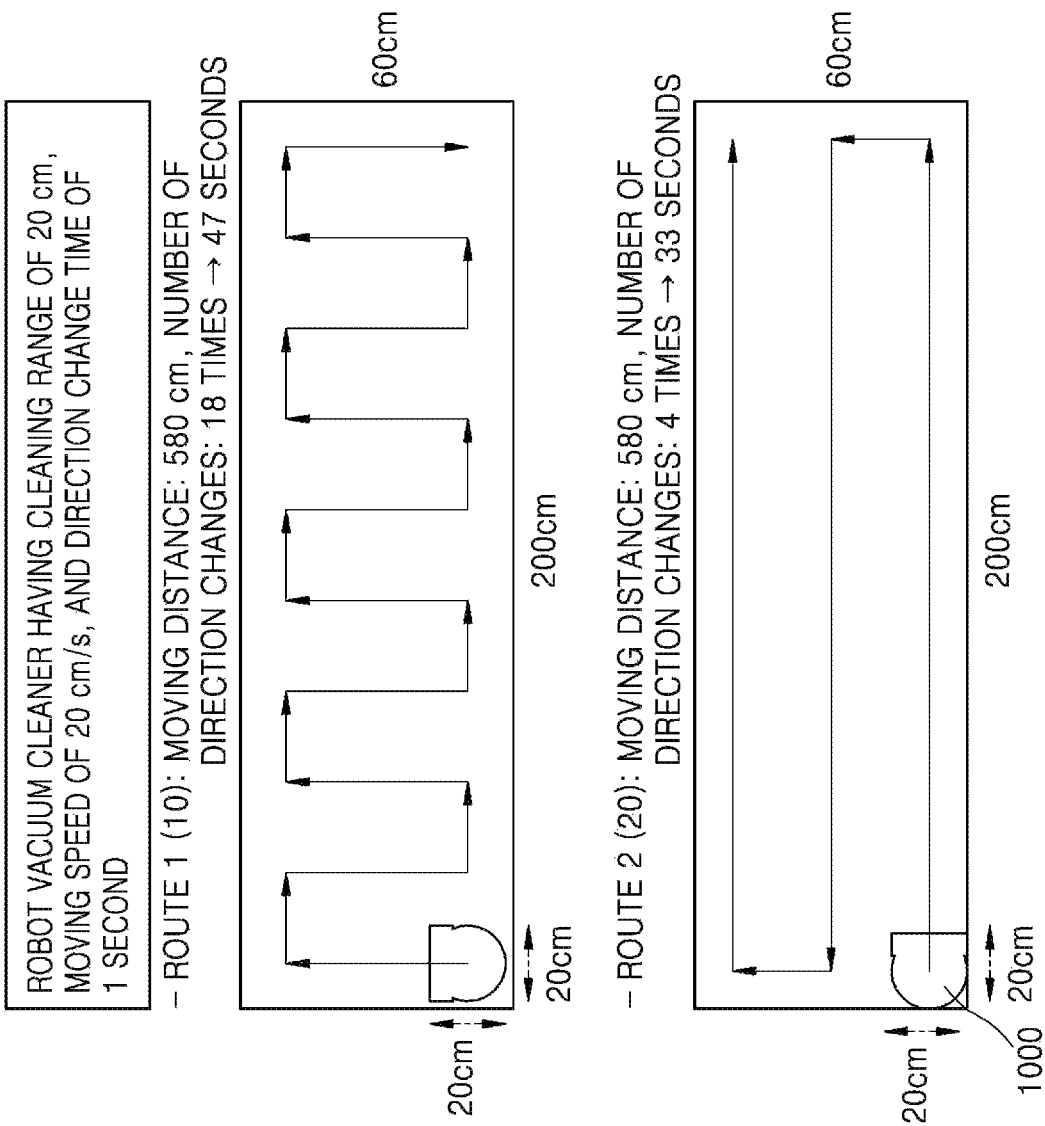
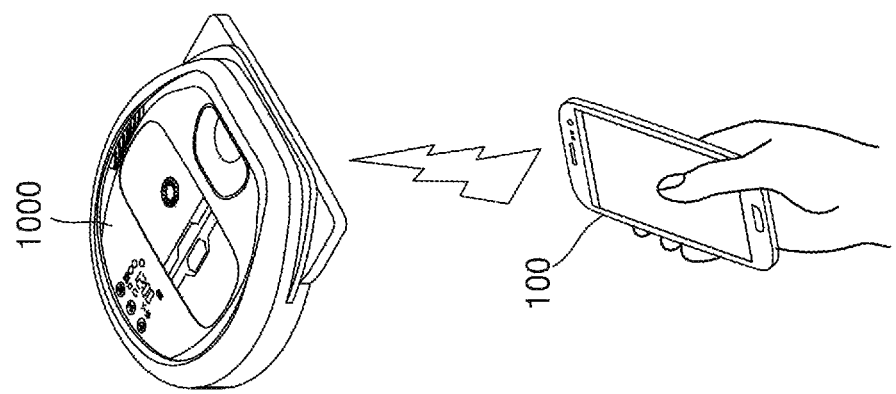

FIG. 5
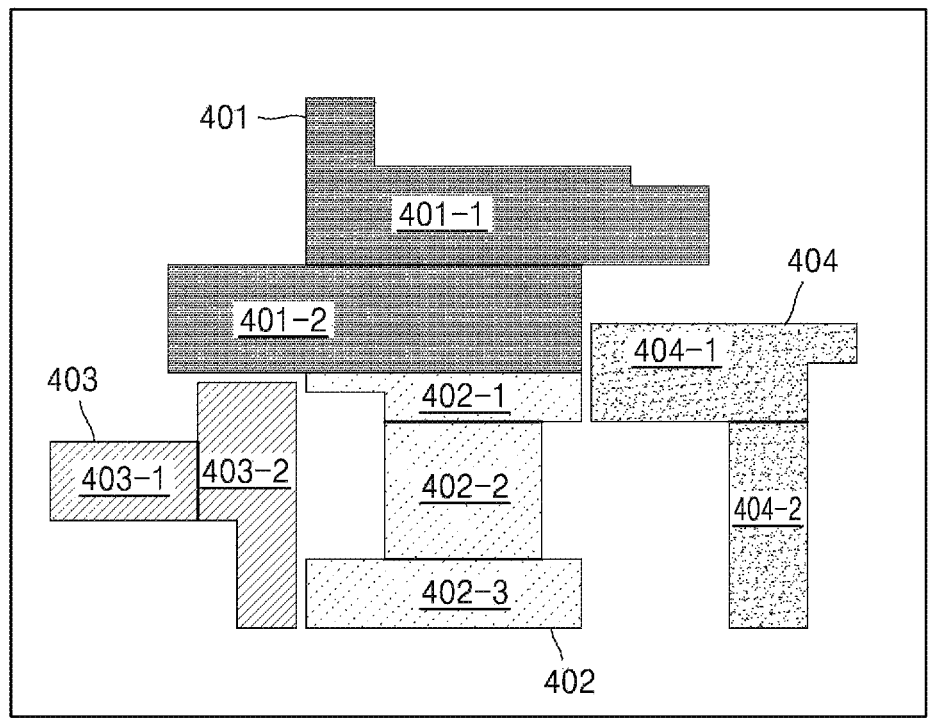
QUICK MODE (510)
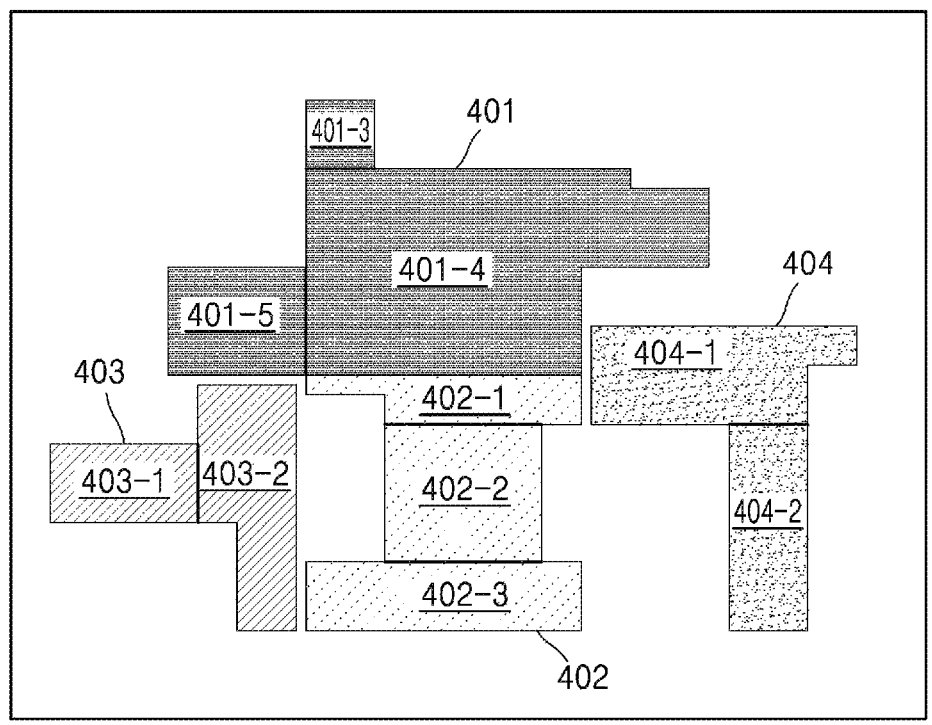
PRECISE MODE (520)

FIG. 14
| | GENERAL ROBOT VACUUM CLEANER | ROBOT VACUUM CLEANER ACCORDING TO EMBODIMENT OF DISCLOSURE |
|---|---|---|
| PLAN OF CLEANING ROUTE | 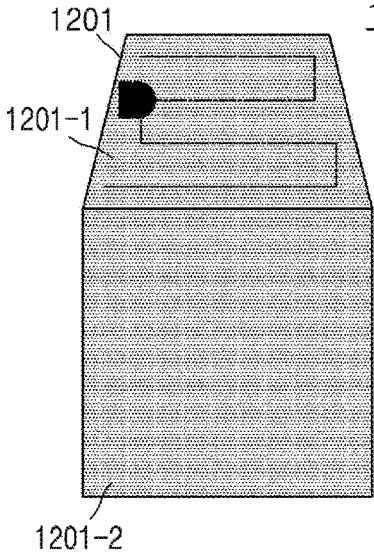 | 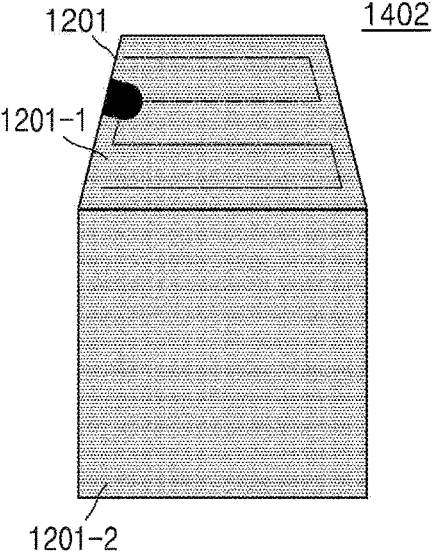 |

ROBOT VACUUM CLEANER AND CLEANING ROUTE PLANNING METHOD THEREOF

CROSS-REFERENCE TO RELATED APPLICATION

This application is based on and claims priority under 35 U.S.C. § 119 to Korean Patent Application No. 10-2018-0156268, filed on Dec. 6, 2018, in the Korean Intellectual Property Office, the disclosure of which is incorporated by reference herein in its entirety.

BACKGROUND

1. Field

The disclosure relates to a method by which a robot vacuum cleaner plans an efficient cleaning route and a robot vacuum cleaner therefor.

2. Description of Related Art

With the increasing interest in autonomous driving apparatuses, technologies for enabling autonomous driving have attracted attention. In order for an apparatus to move by itself without operation by a user, (1) technology for recognizing the external environment, (2) technology for combining recognized information to determine acceleration, stop, and/or turn operations and determine a driving route, and (3) technology for controlling the movement of the apparatus using determined information are required. All technologies have to be organically combined so as to enable autonomous driving, but technology for recognizing the external environment of the apparatus is becoming more important. Recognizing the external environment is the first element for autonomous driving, and it is necessary for electrical and electronic technologies and IT technologies to converge to recognize the external environment.

The technology for recognizing the external environment may be largely classified into a sensor-based recognition technology and a connection-based recognition technology. Sensors mounted on apparatuses for autonomous driving include ultrasonic, camera, radar, and lidar sensors. These sensors may be mounted on an apparatus alone or together with other sensors, to recognize the external environment of the apparatus and geographical features.

One example of an autonomous driving apparatus may be a robot vacuum cleaner. Robot vacuum cleaners may refer to automatic floor vacuum cleaners that operate autonomously in a defined area without human intervention. Robot vacuum cleaners may have functions such as floor detection, obstacle avoidance, collision detection, battery monitoring, autonomous battery charging, fan motor current monitoring, and autonomous dust bag dump. In addition, robot vacuum cleaners may increasingly require reasoning and artificial intelligence capabilities that enable the robot vacuum cleaners to act in context based on sensing information and knowledge the robot vacuum cleaners themselves have.

SUMMARY

Embodiments of the disclosure provide a method of efficiently planning a cleaning route according to a cleaning mode (for example, a quick mode or a precise mode) and a robot vacuum cleaner therefor.

Additional aspects will be set forth in part in the description which follows and, in part, will be apparent from the description.

According to an example embodiment of the disclosure, a method, performed by a robot vacuum cleaner, of planning a cleaning route includes: dividing an indoor space into at least one cleanable region based on an indoor space map generated using at least one sensor included in the robot vacuum cleaner; dividing the at least one cleanable region into a plurality of partial regions based on a cleaning mode of the robot vacuum cleaner; and planning a first cleaning route to control a number of direction changes of the robot vacuum cleaner with respect to each of the plurality of partial regions based on the cleaning mode being a first mode.

According to another example embodiment of the disclosure, a robot vacuum cleaner includes: a memory configured to store one or more instructions; at least one sensor configured to generate an indoor space map; and a processor connected to the at least one sensor, wherein the processor is configured to execute the one or more instructions to control the robot vacuum cleaner to: divide an indoor space into at least one cleanable region based on the indoor space map; divide the at least one cleanable region into a plurality of partial regions based on a cleaning mode of the robot vacuum cleaner; and plan a first cleaning route to control a number of direction changes of the robot vacuum cleaner with respect to each of the plurality of partial regions based on the cleaning mode being a first mode.

According to another example embodiment of the disclosure, a computer program product includes a non-transitory computer-readable recording medium having recorded thereon a program which, when executed, causes an apparatus to perform operations comprising: dividing an indoor space into at least one cleanable region based on an indoor space map generated using at least one sensor included in a robot vacuum cleaner; dividing the at least one cleanable region into a plurality of partial regions based on a cleaning mode of the robot vacuum cleaner; and planning a first cleaning route to control a number of direction changes of the robot vacuum cleaner with respect to each of the plurality of partial regions based on the cleaning mode being a first mode.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 1 is a diagram illustrating an example cleaning route planning system according to an embodiment of the disclosure;

FIG. 5 is a diagram illustrating an example operation by which a robot vacuum cleaner divides a cleanable region, according to an embodiment of the disclosure;

FIG. 14 is a diagram illustrating an example operation by which a robot vacuum cleaner plans a cleaning route according to a precise mode, according to an embodiment of the disclosure;

DETAILED DESCRIPTION

Figure 2:
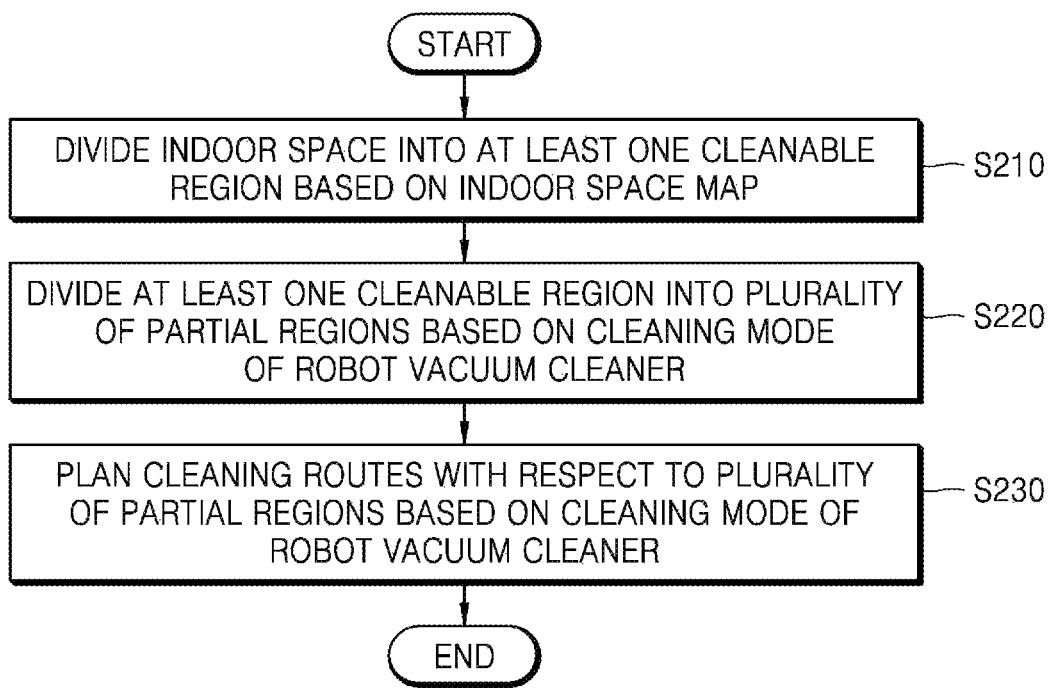
FIG. 2 is a flowchart illustrating an example cleaning route planning method of a robot vacuum cleaner, according to an embodiment of the disclosure.

The terms as used herein will be briefly described and the disclosure will be described in greater detail below.

The terms as used herein are those general terms currently widely used in the art by taking into account functions in the disclosure, but the terms may vary according to the intention of those of ordinary skill in the art, precedents, or new technology in the art. Moreover, terms may be arbitrarily selected, and in this case, the detailed meaning thereof will be described in or will be understood from the description in the disclosure. Therefore, the terms as used herein should be understood not as simple names but based on the meaning of the terms and the overall description of the disclosure.

It will be understood that the terms such as "comprise", "include", and "have", when used herein, specify the presence of stated elements, but do not preclude the presence or addition of one or more other elements. The terms "interface" and "module" as used herein may refer, for example, to a unit for processing at least one function or operation, which may be implemented by hardware, software, or a combination thereof.

Throughout the disclosure, the expression "at least one of a, b or c" indicates only a, only b, only c, both a and b, both a and c, both b and c, all of a, b, and c, or variations thereof.

Hereinafter, various example embodiments of the disclosure will be described in greater detail with reference to the accompanying drawings. However, the disclosure may be embodied in many different forms and is not limited to the various example embodiments of the disclosure described herein. In order to clearly describe the disclosure, parts having little or no relation to the description may be omitted, and like reference numerals are assigned to like elements throughout the disclosure.

FIG. 1 is a diagram illustrating an example cleaning route planning system according to an embodiment of the disclosure.

Referring to FIG. 1, the cleaning route planning system according to an example embodiment of the disclosure may include a robot vacuum cleaner 1000 and a mobile device 100. However, all illustrated elements are not essential elements. The cleaning route planning system may include more elements than those illustrated in FIG. 1, or may include fewer elements than those illustrated in FIG. 1. For example, the cleaning route planning system may include the robot vacuum cleaner 1000 only, or may further include, in addition to the robot vacuum cleaner 1000 and the mobile device 100, a server. The respective elements will be described in greater detail below.

The robot vacuum cleaner 1000 may clean a cleaning space while moving the cleaning space. The cleaning space may be, for example, a space requiring cleaning, such as a home or an office, or the like. The robot vacuum cleaner 1000 may refer, for example, to a robot apparatus capable of moving by itself using wheels and may perform a cleaning function while moving in a cleaning space.

The robot vacuum cleaner 1000 may search an indoor space using at least one sensor and generate an indoor space map. The indoor space may refer, for example, to a cleaning space in which the robot vacuum cleaner 1000 is substantially freely movable. For example, the indoor space may not include a toilet, a veranda, a stair, or the like, in which the robot vacuum cleaner 1000 is not movable, and may include a kitchen, a living room, a room, a library, or the like, in which the robot vacuum cleaner 1000 is movable. For example, the indoor space map may include data regarding at least one of, for example, and without limitation, a navigation map used for driving during cleaning, a simultaneous localization and mapping (SLAM) map used for position recognition, an obstacle recognition map on which information about a recognized obstacle is recorded, or the like.

According to an example embodiment of the disclosure, the robot vacuum cleaner 1000 may include an artificial intelligence (AI) processor. The AI processor may, for example, and without limitation, be manufactured in the form of a dedicated hardware chip for AI, or may be manufactured as part of an existing general-purpose processor (for example, a central processing unit (CPU) or an application processor) or a dedicated graphics processor (for example, a graphics processing unit (GPU)), and may be mounted on the robot vacuum cleaner 1000. The robot vacuum cleaner 1000 may use the AI processor to plan a cleaning route. In addition, the robot vacuum cleaner 1000 may use the AI processor to adjust suction strength according to an amount of dust in the room or a material of a floor.

According to an example embodiment of the disclosure, the robot vacuum cleaner 1000 may include a communication interface (e.g., comprising communication circuitry) configured to communicate with an external device. According to an example embodiment of the disclosure, the robot vacuum cleaner 1000 may communicate with a mobile device 100 or a server (not illustrated) through the communication interface. The communication interface may include various communication circuitry, such as, for example, and without limitation, a short-range wireless communication interface, a mobile communication interface, and the like. The short-range wireless communication interface may include a Bluetooth communication interface, a Bluetooth low energy (BLE) communication interface, a near field communication interface, a wireless local access network (WLAN) (Wi-Fi) communication interface, a Zigbee communication interface, an infrared data association (IrDA) communication interface, a Wi-Fi direction (WFD) communication interface, an ultra-wideband (UWB) communication interface, or an Ant+ communication interface, but embodiments of the disclosure are not limited thereto.

The mobile device 100 may transmit, to the robot vacuum cleaner 1000, an instruction for controlling the robot vacuum cleaner 1000. For example, when a user designates a region (for example, a kitchen) requiring cleaning to the mobile device 100, or when a user sets a cleaning mode of the robot vacuum cleaner 1000, the mobile device 100 may transmit, to the robot vacuum cleaner 1000, control information including information about the region (for example, the kitchen) requiring cleaning and information about the cleaning mode. In this case, the robot vacuum cleaner 1000 may perform cleaning in the cleaning mode set for the kitchen according to the control information.

According to an example embodiment of the disclosure, the mobile device 100 may display a cleaning state (for example, cleaning, cleaning completion, charging, or the like) of the robot vacuum cleaner 1000 to the user. For example, the mobile device 100 may collect information about the cleaning state from the robot vacuum cleaner 1000 and display the cleaning state of the robot vacuum cleaner 1000 on an execution window of a cleaning application. In addition, the mobile device 100 may display current position information about the robot vacuum cleaner 1000. For example, the mobile device 100 may collect real-time position information from the robot vacuum cleaner 1000 and mark the current position of the robot vacuum cleaner 1000 on the indoor space map.

The mobile device 100 according to an example embodiment of the disclosure may be implemented in various forms. The mobile device 100 may, for example, and without limitation, include a digital camera, a smart phone, a laptop computer, a tablet personal computer (PC), an e-book terminal, a digital broadcasting terminal, a personal digital assistant (PDA), a personal multimedia player (PMP), a navigation system, an MP3 player, or the like, but embodiments of the disclosure are not limited thereto. For example, the mobile device 100 may be a wearable device that may be worn by a user. The wearable device may include, for example, and without limitation, at least one of an accessory type device (for example, a watch, a ring, a bracelet, an anklet, a necklace, glasses, or a contact lens), a head-mounted device (HMD), a fabric- or cloth-integrated type device (for example, electronic clothing), a body-attached type device (for example, a skin pad), a body implanted type device (for example, an implantable circuit), or the like. Hereinafter, for convenience of description, a case in which the mobile device 100 is a smart phone will be described as an example.

Referring to FIG. 1, according to an example embodiment of the disclosure, the robot vacuum cleaner 1000 may plan different cleaning routes with respect to the same cleaning space. For example, referring to FIG. 1, the robot vacuum cleaner 1000 may plan a first cleaning route 10 and a second cleaning route 20 with respect to a rectangular cleaning region (200 cm×60 cm). The first cleaning route 10 may be a route to control the number of direction changes of the robot vacuum cleaner 1000 to be large (e.g., maximum), and the second cleaning route 20 may be a route to control the number of direction changes of the robot vacuum cleaner 1000 to be small (e.g., minimize). The term "control" as used herein in connection with the number of direction changes, distance, etc., may refer, for example, to determining a number or relative number of direction changes, continuous straight distance, etc., and may include, but is not limited to, for example, maximizing, minimizing, reducing, increasing, etc. a number of direction changes, continuous straight distance, etc. in a space. In addition, the second cleaning route 20 may be a route in which a length (for example, 160 cm) of a continuous straight distance is controlled, for example, maximized.

In this example, it is assumed that a cleaning range of the robot vacuum cleaner 1000 is 20 cm, a moving speed of the robot vacuum cleaner 1000 is 20 cm/s, and 1 second is taken to change a direction. In this example, when comparing a cleaning time of the first cleaning route 10 with a cleaning time of the second cleaning route 20, the first cleaning route 10 takes 47 seconds because a total movement distance is 580 cm and the number of direction changes is 18 times, and the second cleaning route 20 takes 33 seconds because a total movement distance is 580 cm and the number of direction changes is 4 times. Therefore, when it is necessary to shorten the cleaning time, it may be efficient for the robot vacuum cleaner 1000 to perform cleaning along the second cleaning route 20. Meanwhile, when it is necessary to perform cleaning more finely, it may be efficient to perform cleaning along the first cleaning route 10. In the case of the first cleaning route 10, the surface coming into contact with the wall is maximized, and thus, it is possible to perform fine cleaning. An operation by which the robot vacuum cleaner 1000 efficiently plans the cleaning route based on the purpose will be described in greater detail below with reference to FIG. 2.

FIG. 2 is a flowchart illustrating an example cleaning route planning method of the robot vacuum cleaner 1000, according to an embodiment of the disclosure.

In operation S210, the robot vacuum cleaner 1000 may divide an indoor space into at least one cleanable region based on an indoor space map.

According to an example embodiment of the disclosure, the robot vacuum cleaner 1000 may generate the indoor space map using at least one sensor. For example, the robot vacuum cleaner 1000 may generate the indoor space map using at least one of, for example, and without limitation, an image sensor (camera), a lidar sensor, an ultrasonic sensor, or the like.

According to an example embodiment of the disclosure, the robot vacuum cleaner 1000 may acquire the indoor space map from an external device. For example, the robot vacuum cleaner 1000 may acquire the indoor space map from the mobile device 100 or the server connected to the robot vacuum cleaner 1000, or may acquire the indoor space map from other robot vacuum cleaners, but embodiments of the disclosure are not limited thereto.

The robot vacuum cleaner 1000 may divide the indoor space into at least one cleanable region using the indoor space map. According to an example embodiment of the disclosure, the robot vacuum cleaner 1000 may divide the indoor space into at least one cleanable region based on the purpose. For example, the robot vacuum cleaner 1000 may analyze a camera image captured by the camera and identify the purpose of the indoor space. For example, when a first camera image includes a table, a sink, and the like, the robot vacuum cleaner 1000 may identify (e.g., determine) that a place where the first camera image is acquired is a kitchen. When a second camera image includes a sofa, a TV, an air conditioner, and the like, the robot vacuum cleaner 1000 may identify that a place where the second camera image is acquired is a living room. When a third camera image includes a bed, a wardrobe, and a dressing table, the robot vacuum cleaner 1000 may identify that a place where the third camera image is acquired is a main room. Therefore, the robot vacuum cleaner 1000 may identify the kitchen, the living room, the main room, and the like on the indoor space map and divide the indoor space into a first cleanable region, a second cleanable region, and a third cleanable region based on the purpose. In this example, the robot vacuum cleaner 1000 may define the kitchen as the first cleanable region, define the living room as the second cleanable region, and define the main room as the third cleanable region.

According to an example embodiment of the disclosure, the robot vacuum cleaner 1000 may divide the indoor space into at least one cleanable region based on a shape. For example, the robot vacuum cleaner 1000 may divide the indoor space included in the indoor space map into a circular region, a rectangular region, a triangular region, a trapezoidal region, and the like.

In operation S220, the robot vacuum cleaner 1000 may divide at least one cleanable region into a plurality of partial regions based on the cleaning mode of the robot vacuum cleaner 1000.

According to an example embodiment of the disclosure, the robot vacuum cleaner 1000 may determine one of the first mode and the second mode as the cleaning mode of the robot vacuum cleaner 1000 based, for example, on a user input. A first mode may, for example, be a mode in which the cleaning time is shortened. Hereinafter, for convenience of description, the first mode may be referred to hereinafter as a quick mode. The second mode may be a mode for precise cleaning. Hereinafter, for convenience of description, the second mode may be referred to hereinafter as a precise mode.

For example, the user may input whether the cleaning mode of the robot vacuum cleaner 1000 is set to the first mode (quick mode) or the second mode (precise mode). When the indoor space is not too dirty and the quick cleaning may be desired, the user may set the cleaning mode to the quick mode. Meanwhile, in the case of weather with a lot of fine dust, the user may set the cleaning mode to the precise mode. The user may set the cleaning mode through the input interface of the robot vacuum cleaner 1000, or may set the cleaning mode through a voice command.

According to an example embodiment of the disclosure, the robot vacuum cleaner 1000 may determine one of the first mode (quick mode) and the second mode (precise mode) as the cleaning mode of the robot vacuum cleaner 1000, based on the purpose of at least one cleanable region (for example, the kitchen, the living room, the study, the main room, the dressing room, or the like). For example, the robot vacuum cleaner 1000 may determine the precise mode as the cleaning mode with respect to the kitchen and the living room and may determine the quick mode as the cleaning mode with respect to the study and the dressing room.

According to an example embodiment of the disclosure, the robot vacuum cleaner 1000 may measure an amount of dust or a contamination level in the indoor space and determine the cleaning mode according to the amount of dust or the contamination level. For example, the robot vacuum cleaner 1000 may determine the second mode (precise mode) as the cleaning mode when the amount of dust (or the contamination level) of the indoor space is greater than a threshold value, and may the first mode (quick mode) as the cleaning mode when the amount of dust (or the contamination level) of the indoor space is less than or equal to the threshold value.

According to an example embodiment of the disclosure, the robot vacuum cleaner 1000 may divide at least one cleanable region into a plurality of partial regions based on the cleaning mode of the robot vacuum cleaner 1000. For example, when the cleaning mode is the first mode (quick mode), the robot vacuum cleaner 1000 may divide the cleanable region into regions capable of planning a cleaning route in which, for example, the number of direction changes is minimum and/or reduced and the distance of the continuous straight section is maximum and/or increased. On the other hand, when the cleaning mode is the second mode (precise mode), the robot vacuum cleaner 1000 may divide the cleanable region into regions capable of planning a cleaning route in which the number of direction changes is maximum and/or increased.

In operation S230, the robot vacuum cleaner 1000 may plan cleaning routes with respect to the partial regions, based on the cleaning mode of the robot vacuum cleaner 1000.

The cleaning routes with respect to the partial regions may refer, for example, to routes through which the robot vacuum cleaner 1000 moves to efficiently clean the respective partial regions. The cleaning route may include a start point and an end point and may be formed by a plurality of lines.

For example, an operation by which the robot vacuum cleaner 1000 plans the cleaning route based on the cleaning mode will be described in greater detail below with reference to FIG. 3.

Figure 3:
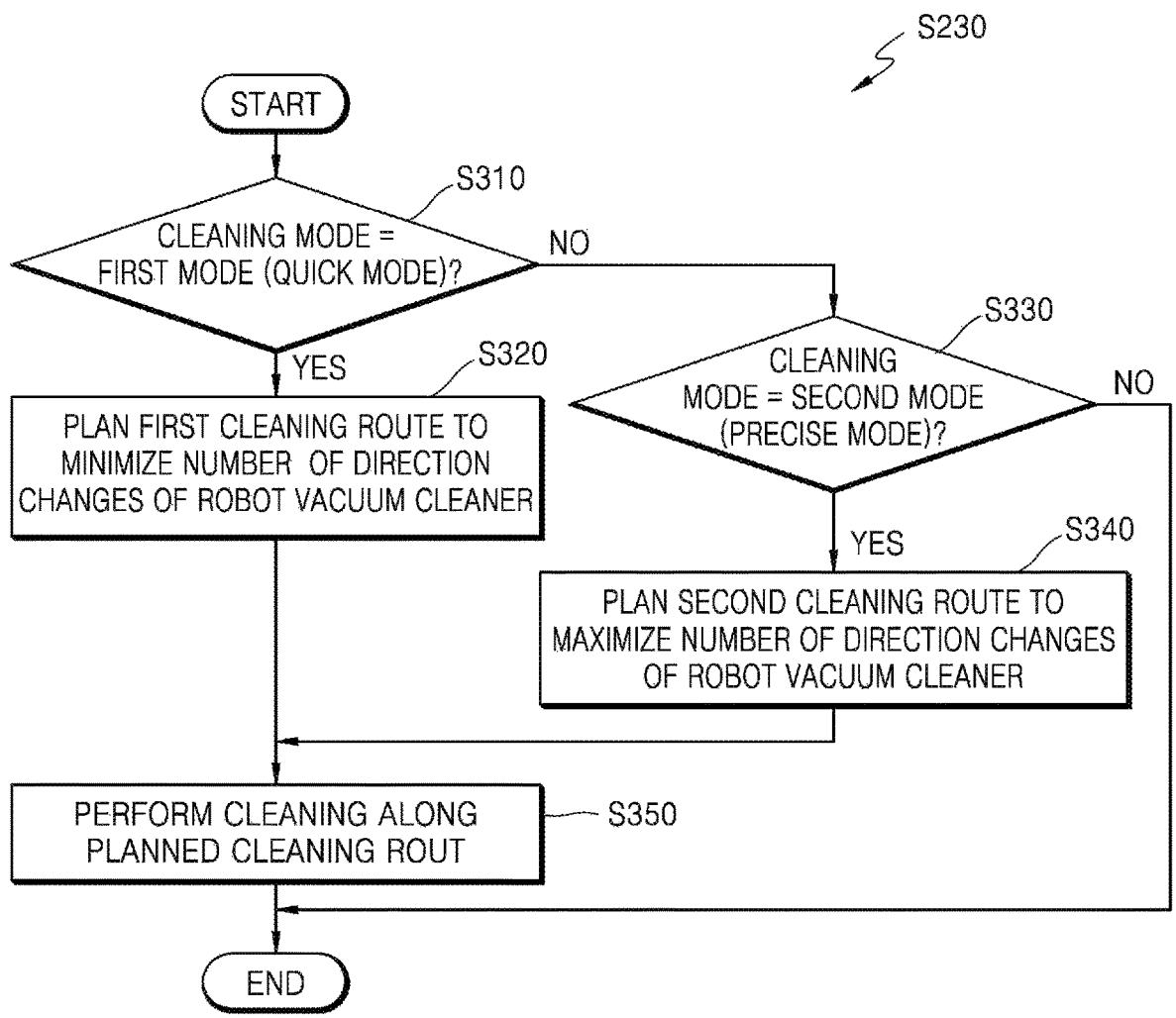
FIG. 3 is a flowchart illustrating an example cleaning route planning method based on a cleaning mode, according to an embodiment of the disclosure.

FIG. 3 is a flowchart illustrating an example cleaning route planning method based on a cleaning mode, according to an embodiment of the disclosure.

In operations S310 and S320, when a cleaning mode is a first mode (quick mode), the robot vacuum cleaner 1000 may plan a first cleaning route to minimize and/or reduce the number of direction changes of the robot vacuum cleaner 1000. For example, when a partial region is a horizontally long rectangular region, the robot vacuum cleaner 1000 may plan a cleaning route (for example, the second cleaning route 20 in FIG. 1) so that a distance of a horizontal travel section becomes longer. For example, the robot vacuum cleaner 1000 may plan a cleaning route so as to move in zigzag in a horizontal direction. In this example, the number of direction changes may be minimized and/or reduced.

In operations S330 and S340, when the cleaning mode is a second mode (precise mode), the robot vacuum cleaner 1000 may plan a second cleaning route to maximize and/or increase the number of direction changes of the robot vacuum cleaner 1000. For example, when a partial region is a horizontally long rectangular region, the robot vacuum cleaner 1000 may plan a cleaning route (for example, the second cleaning route 20 in FIG. 1) so that a distance of a vertical travel section becomes longer. That is, the robot vacuum cleaner 1000 may plan a cleaning route so as to move in zigzag in a vertical direction. In this case, the number of direction changes may be maximized and/or increased.

According to an example embodiment of the disclosure, when the cleaning mode is the second mode (precise mode), the robot vacuum cleaner 1000 may, for example, plan the second cleaning route to maximize and/or increase an area where the bumper of the robot vacuum cleaner 1000 comes into contact with the wall.

In operation S350, the robot vacuum cleaner 1000 may perform cleaning along the planned cleaning route selected from the first cleaning route and the second cleaning route. For example, the robot vacuum cleaner 1000 may suction dust on the floor while moving along the planned cleaning route.

Hereinafter, an operation by which the robot vacuum cleaner 1000 plans a cleaning route using an indoor space map will be described in greater detail below with reference to FIGS. 4, 5, 6 and 7.

Figure 4:
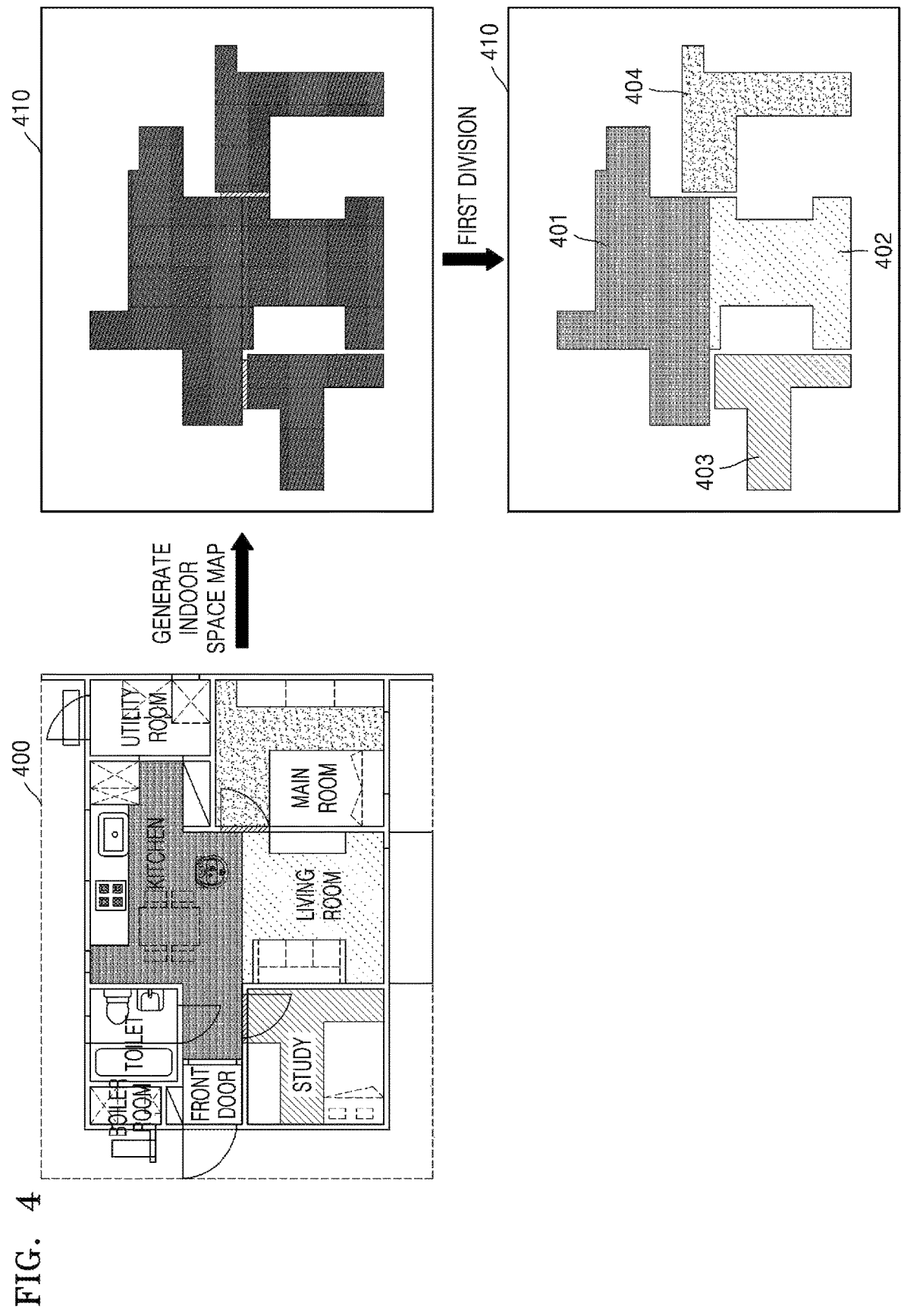
FIG. 4 is a diagram illustrating an example indoor space map according to an embodiment of the disclosure.

FIG. 4 is a diagram illustrating an example indoor space map according to an embodiment of the disclosure.

Referring to FIG. 4, the robot vacuum cleaner 1000 may generate an indoor space map 410 while moving within a room or area 400. For example, because the robot vacuum cleaner 1000 cannot pass through an obstacle such as a wall, a wardrobe, or a chest of drawers, regions other than an obstacle in the room 400 may appear as the indoor space map 410. In addition, because the robot vacuum cleaner 1000 may not approach a front door or a toilet using a fall prevention sensor, a region such as the front door or the toilet may appear dark in the indoor space map 410, or may not appear in the indoor space map 410. In addition, because the robot vacuum cleaner 1000 may not access a boiler room or a utility room that is blocked by a door, the boiler room or the utility room may appear dark in the indoor space map 410, or may not appear in the indoor space map 410.

According to an example embodiment of the disclosure, the robot vacuum cleaner 1000 may divide the indoor space into at least one cleanable region on the indoor space map. For example, the robot vacuum cleaner 1000 may divide the indoor space into a plurality of cleanable regions according to the purpose of the indoor space (for example, the kitchen, the living room, the study, and the main room). For example, the robot vacuum cleaner 1000 may analyze the camera image, identify the purpose of the indoor space, and identify the indoor space into a first cleanable region (kitchen region 401), a second cleanable region (living room region 402), a third cleanable region (study region 403), and a fourth cleanable region (main room region 404), but embodiments of the disclosure are not limited thereto. For example, the robot vacuum cleaner 1000 may divide the indoor space into a plurality of cleanable regions based, for example, on a door.

According to an example embodiment of the disclosure, the robot vacuum cleaner 1000 may divide each of the cleanable regions into a plurality of partial regions before planning the cleaning route. An operation by which the robot vacuum cleaner 1000 divides each of the cleanable regions into the partial regions will be described in greater detail below with reference to FIG. 5.

FIG. 5 is a diagram illustrating an example operation by which the robot vacuum cleaner 1000 divides a cleanable region, according to an embodiment of the disclosure.

According to an example embodiment of the disclosure, the robot vacuum cleaner 1000 may divide a cleanable region into a plurality of partial regions based on the cleaning mode. For example, when a cleaning mode of the robot vacuum cleaner 1000 is a quick mode 510, the robot vacuum cleaner 1000 may divide the cleanable region into regions capable of planning a cleaning route in which the number of direction changes is minimum and/or reduced and a distance of a continuous straight section is maximum and/or increased. For example, the robot vacuum cleaner 1000 may subdivide a kitchen region 401 into regions 401-1 and 401-2, may subdivide a living room region 402 into regions 402-1, 402-2, and 402-3, may subdivide a study region 403 into regions 403-1 and 403-2, and may subdivide a main room region 404 into regions 404-1 and 404-2.

When the cleaning mode of the robot vacuum cleaner 1000 is a precise mode 520, the robot vacuum cleaner 1000 may divide the cleanable region into regions capable of planning a cleaning route in which the number of direction changes is maximum and/or increased. For example, the robot vacuum cleaner 1000 may subdivide a kitchen region 401 into regions 401-3, 401-4, and 401-5 may subdivide a living room region 402 into regions 402-1, 402-2, and 402-3, may subdivide a study region 403 into regions 403-1 and 403-2, and may subdivide a main room region 404 into regions 404-1 and 404-2.

According to an example embodiment of the disclosure, the partial regions divided based on the cleaning mode may be different from each other as illustrated with respect to the kitchen region 401, or may be identical to each as illustrated with respect to the living room region 402, the study region 403, and the main room region 404.

Figure 6:
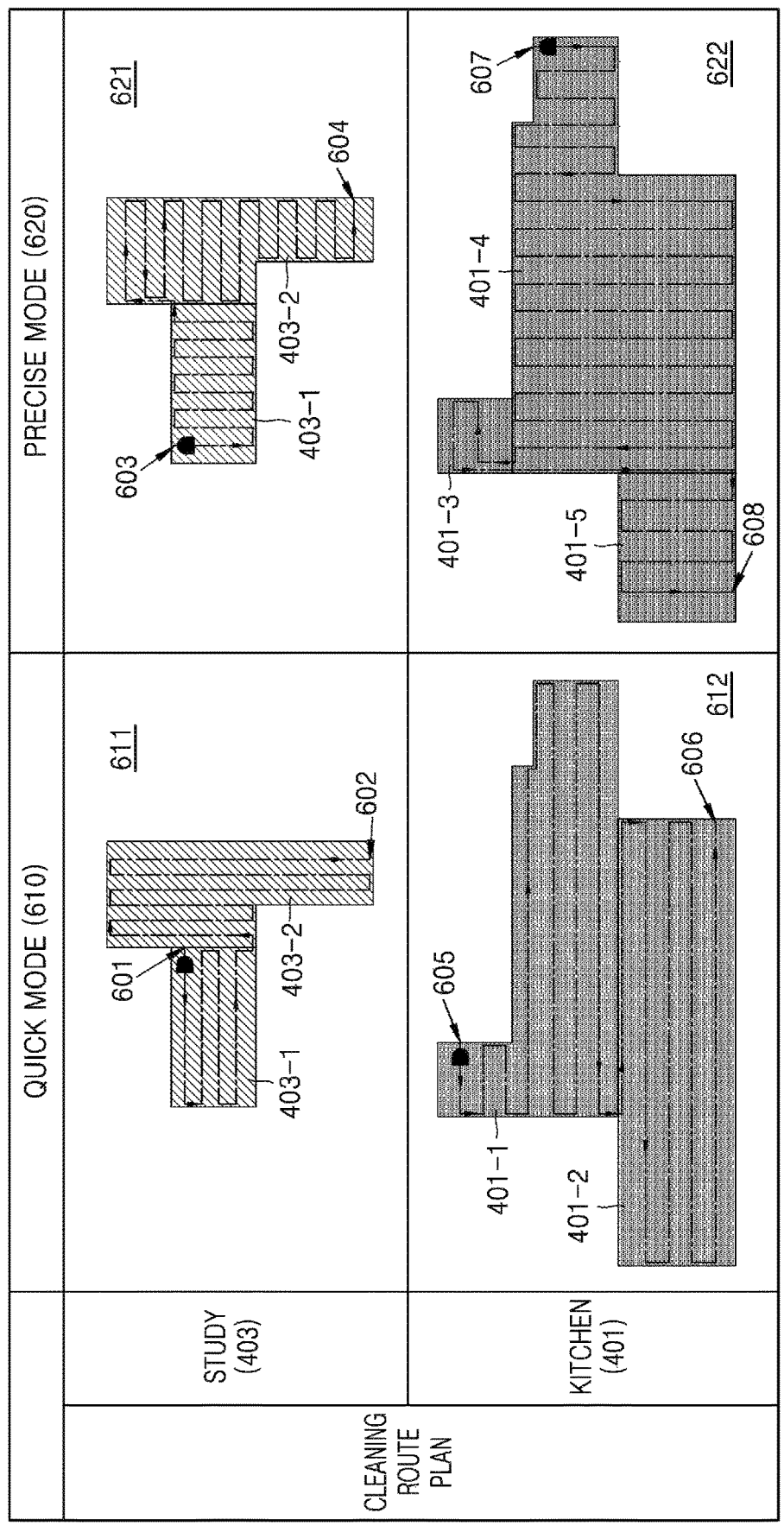
FIG. 6 is a diagram illustrating an example operation by which a robot vacuum cleaner plans a cleaning route based on a cleaning mode, according to an embodiment of the disclosure.

FIG. 6 is a diagram illustrating an example operation by which the robot vacuum cleaner 1000 plans a cleaning route based on a cleaning mode, according to an embodiment of the disclosure.

According to an example embodiment of the disclosure, the robot vacuum cleaner 1000 may plan another cleaning route based on whether the cleaning mode is a quick mode 610 or a precise mode 620. For example, when the cleaning mode is the quick mode 610, the robot vacuum cleaner 1000 may plan a first cleaning route 611 with respect to a study region 403. The first cleaning route 611 is a route in which the distance of the straight section is maximized and/or increased, and may be a route in which a point 601 is a start point and a point 602 is an arrival (e.g., end) point. The first cleaning route 611 may be a route through which the robot vacuum cleaner 1000 moves in zigzag in a horizontal direction with respect to the region 403-1 and moves in zigzag in a vertical direction with respect to the region 403-2. According to the first cleaning route 611, the number of direction changes of the robot vacuum cleaner 1000 may, for example, be about 20 times.

On the other hand, when the cleaning mode is the precise mode 620, the robot vacuum cleaner 1000 may plan the second cleaning route 621 with respect to the study region 403. The second cleaning route 621 is a route in which the number of direction changes is maximized and/or increased, and may be a route in which a point 603 is a start point and a point 604 is an arrival point. The second cleaning route 621 may be a route through which the robot vacuum cleaner 1000 moves in zigzag in a vertical direction with respect to the region 403-1 and moves in zigzag in a horizontal direction with respect to the region 403-2. According to the second cleaning route 621, the number of direction changes of the robot vacuum cleaner 1000 may, for example, be about 41 times.

Therefore, in a case in which the robot vacuum cleaner 1000 performs cleaning along the first cleaning route 611, the number of direction changes of the robot vacuum cleaner 1000 is small, as compared with a case in which the robot vacuum cleaner 1000 performs cleaning along the second cleaning route 621, thereby shortening the cleaning time. On the other hand, in a case in which the robot vacuum cleaner 1000 performs cleaning along the second cleaning route 621, the number of direction changes of the robot vacuum cleaner 1000 is large, as compared with a case in which the robot vacuum cleaner 1000 performs cleaning along the first cleaning route 611. Thus, the cleaning time is increased, as compared with the first cleaning route 611. However, because the surface of the robot vacuum cleaner 1000 that is in contact with the wall increases, the robot vacuum cleaner may perform more precise cleaning along the second cleaning route 621 than along the first cleaning route 611.

When the cleaning mode is the quick mode 610, the robot vacuum cleaner 1000 may plan a third cleaning route 612 with respect to the kitchen region 401. The third cleaning route 612 may be a route in which the distance of the straight section is maximized and/or increased, and may be a route in which a point 605 is a start point and a point 606 is an arrival (e.g., end) point. The third cleaning route 612 may be a route through which the robot vacuum cleaner 1000 moves in zigzag in a horizontal direction with respect to both the regions 401-1 and 401-2. According to the third cleaning route 612, the number of direction changes of the robot vacuum cleaner 1000 may, for example, be about 22 times.

When the cleaning mode is the precise mode 620, the robot vacuum cleaner 1000 may plan a fourth cleaning route 622 with respect to the kitchen region 401. The fourth cleaning route 622 may be a route in which the number of direction changes is maximized and/or increased, and may be a route in which a point 607 is a start point and a point 608 is an arrival (e.g., end) point. The fourth cleaning route 622 may be a route through which the robot vacuum cleaner 1000 moves in zigzag in a horizontal direction with respect to the region 401-3 and moves in zigzag in a vertical direction with respect to the regions 401-4 and 401-5. According to the fourth cleaning route 622, the number of direction changes of the robot vacuum cleaner 1000 may be about 44 times.

Therefore, in a case in which the robot vacuum cleaner 1000 performs cleaning along the third cleaning route 612, the number of direction changes of the robot vacuum cleaner 1000 is small, as compared with a case in which the robot vacuum cleaner 1000 performs cleaning along the fourth cleaning route 622, thereby shortening the cleaning time for the kitchen region 401. On the other hand, in a case in which the robot vacuum cleaner 1000 performs cleaning along the fourth cleaning route 622, the number of direction changes of the robot vacuum cleaner 1000 is large, as compared with a case in which the robot vacuum cleaner 1000 performs cleaning along the third cleaning route 612. Thus, the cleaning time is increased, as compared with the third cleaning route 612. However, because the surface of the robot vacuum cleaner 1000 that is in contact with the wall increases, the robot vacuum cleaner may perform more precise cleaning along the fourth cleaning route 622 than along the third cleaning route 612.

Figure 7:
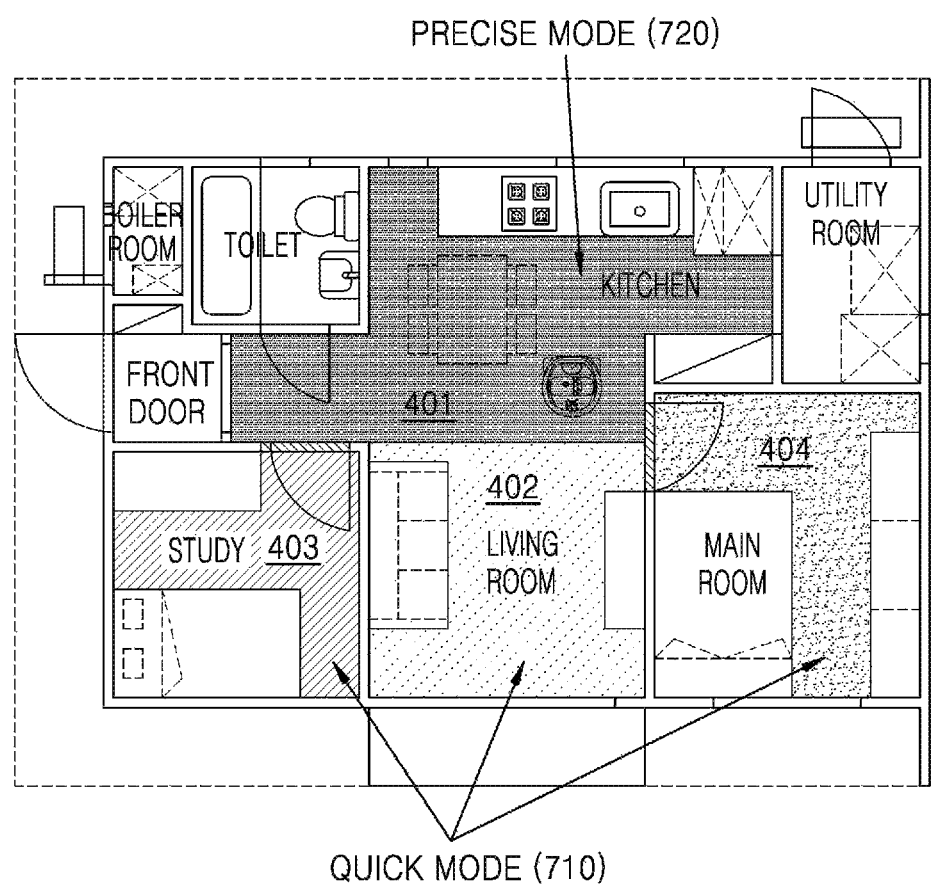
FIG. 7 is a diagram illustrating an example operation by which a robot vacuum cleaner differently determines a cleaning mode with respect to each region, according to an embodiment of the disclosure.

FIG. 7 is a diagram illustrating an example operation by which the robot vacuum cleaner 1000 differently determines a cleaning mode with respect to each region, according to an embodiment of the disclosure.

According to an example embodiment of the disclosure, based, for example, on a user input, the robot vacuum cleaner 1000 may determine the cleaning mode of the kitchen region 401 as a precise mode 720 and may determine the cleaning mode of the living room region 402, the study region 403, and the main room region 404 as a quick mode 710.

According to another embodiment of the disclosure, the robot vacuum cleaner 1000 may differently determine the cleaning mode for each region based on an amount of dust or a contamination level. For example, when the amount of dust in the kitchen region 401 is greater than a threshold value, the robot vacuum cleaner 1000 may determine the precise mode 720 as the cleaning mode of the kitchen region 401. On the other hand, when the amount of dust in the living room region 402, the study region 403, and the main room region 404 is less than the threshold value, the robot vacuum cleaner 1000 may determine the quick mode 710 as the cleaning mode of the living room region 402, the study region 403, and the main room region 404.

Figure 8:
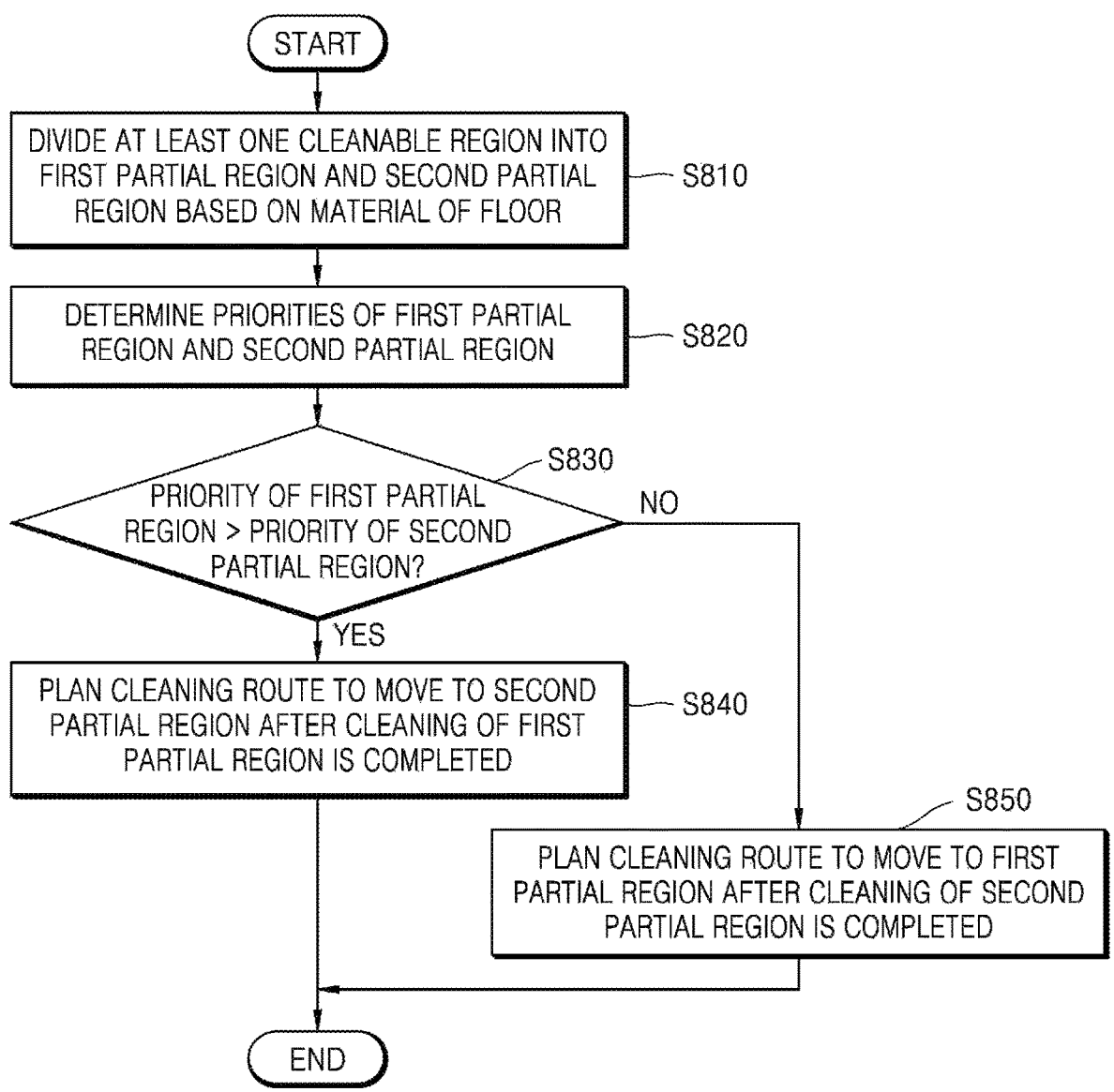
FIG. 8 is a flowchart illustrating an example method of planning a cleaning route based on a material of a floor, according to an embodiment of the disclosure.

FIG. 8 is a flowchart illustrating an example method of planning a cleaning route based on a material of a floor, according to an embodiment of the disclosure.

In operation S810, the robot vacuum cleaner 1000 may divide at least one cleanable region into a first partial region and a second partial region based on the material of the floor.

For example, the robot vacuum cleaner 1000 may separate the cleanable region into a first partial region having a material (for example, a carpet, a rug, an electric blanket, a play mat, and a threshold) to increase a suction force and a second partial region having a general floor material.

In operation S820, the robot vacuum cleaner 1000 may determine priorities of the first partial region and the second partial region. The priorities may be related to the order in which the robot vacuum cleaner 1000 performs cleaning. For example, as the priority is higher, the corresponding region is cleaned earlier, but the disclosure is not limited so limited.

According to an example embodiment of the disclosure, the robot vacuum cleaner 1000 may determine the priorities of the first partial region and the second partial region based, for example, and without limitation, on at least one of current position information or information about a cleanable region to be moved next, etc. For example, when the current position of the robot vacuum cleaner 1000 is closer to the first partial region than the second partial region, the robot vacuum cleaner 1000 may determine the priority of the first partial region to be higher than the priority of the second partial region. In addition, when the cleanable region to which the robot vacuum cleaner 1000 moves next is the study region and the study region is closer to the second partial region than the first partial region, the robot vacuum cleaner 1000 may determine the priority of the second partial region to be lower than the priority of the first partial region.

According to another embodiment of the disclosure, the robot vacuum cleaner 1000 may determine the priorities of the first partial region and the second partial region based, for example, on a user input. For example, the user may set the priority of the region to be cleaned by the robot vacuum cleaner 1000 using the mobile device 100 connected to the robot vacuum cleaner 1000.

In operations S830 and S840, when the priority of the first partial region is higher than the priority of the second partial region, the robot vacuum cleaner 1000 may plan a cleaning route of moving to the second partial region after completing the cleaning of the first partial region.

In operations S830 and S850, when the priority of the first partial region is lower than the priority of the second partial region, the robot vacuum cleaner 1000 may plan a cleaning route of moving to the first partial region after completing the cleaning of the second partial region.

According to an example embodiment of the disclosure, the robot vacuum cleaner 1000 may clean one region and then move to another region based on the priorities with respect to the regions where a suction force has to be differently adjusted. Because it is unnecessary to frequently change the suction force, the cleaning may be efficiently performed.

Hereinafter, a case in which the first partial region is a region in which a carpet is laid and the second partial region is a remaining region in which the carpet is not laid will be described as an example below with reference to FIGS. 9 and 10.

Figure 9:
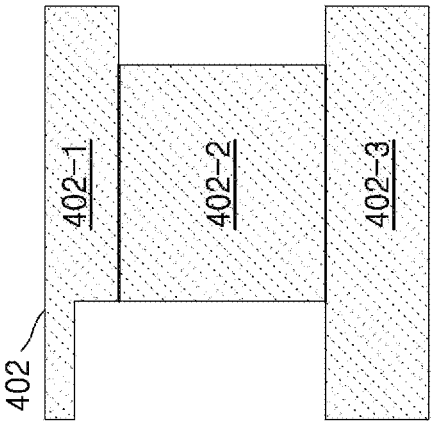
FIG. 9 is a diagram illustrating an example operation by which a robot vacuum cleaner divides a cleanable region into a plurality of partial regions based on the presence or absence of a carpet, according to an embodiment of the disclosure.

FIG. 9 is a diagram illustrating an example operation by which the robot vacuum cleaner 1000 divides a cleanable region into a plurality of partial regions based on the presence or absence of a carpet, according to an embodiment of the disclosure.

According to an example embodiment of the disclosure, in a case 910 in which the cleaning mode of the robot vacuum cleaner 1000 is a quick mode and there is no carpet in a living room region 402, the robot vacuum cleaner 1000 may divide the living room region 402 into regions 402-1, 402-2, and 402-3.

On the other hand, in a case 920 in which the cleaning mode of the robot vacuum cleaner 1000 is a quick mode but there is the carpet in the living room region 402, the robot vacuum cleaner 1000 may divide the living room region 402 into regions 402-4, 402-5, and 402-6.

Figure 10:
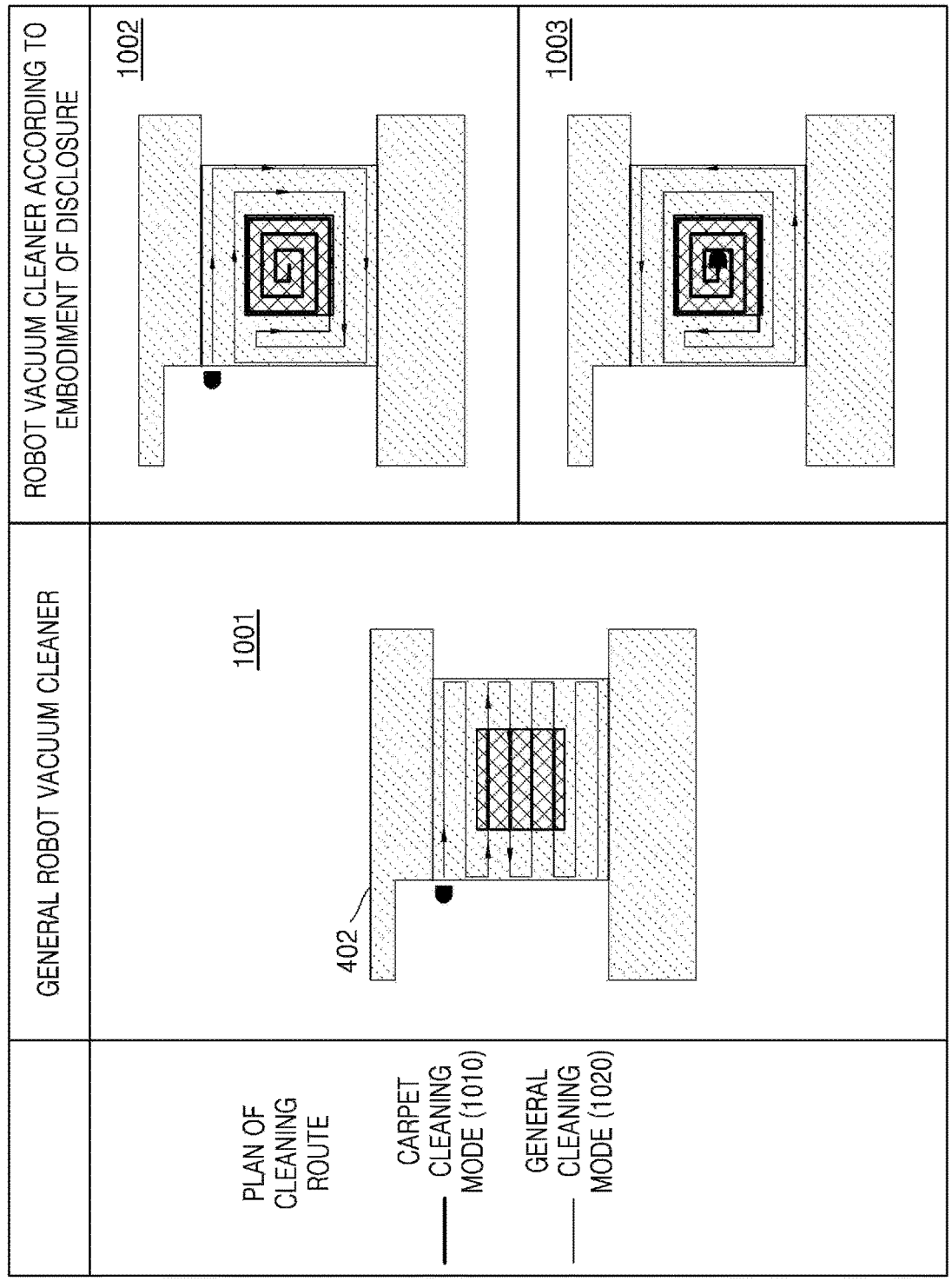
FIG. 10 is a diagram illustrating an example operation by which a robot vacuum cleaner plans cleaning routes with respect to a carpeted region and a remaining region, according to an embodiment of the disclosure.

FIG. 10 is a diagram illustrating an example operation by which the robot vacuum cleaner 1000 plans cleaning routes with respect to a carpeted region and a remaining region, according to an embodiment of the disclosure.

Referring to FIG. 10, a general robot vacuum cleaner may plan a first cleaning route of alternately performing a carpet cleaning mode 1010 and a general cleaning mode 1020 without distinguishing a region in which the carpet is laid (hereinafter, referred to as a carpeted region) from a remaining general region. For example, the general robot vacuum cleaner may change the general cleaning mode 1020 to the carpet cleaning mode 1010 when passing through the carpeted region and may change the carpet cleaning mode 1010 to the general cleaning mode 1020 when passing through the general region.

However, the robot vacuum cleaner 1000 according to an example embodiment of the disclosure may distinguish the carpeted region from the remaining general region. The robot vacuum cleaner 1000 may determine the priorities of the carpeted region and the general region in consideration of a current position. When the priority of the general region is higher than the priority of the carpeted region, the robot vacuum cleaner 1000 may plan a second cleaning route 1002 of moving to the carpeted region after completing the cleaning of the general region. According to the second cleaning route 1002, the robot vacuum cleaner 1000 may operate in the general cleaning mode 1020 having a first suction force in the general region, and may operate in the carpet cleaning mode 1010 having a second suction force higher than the first suction force in the carpeted region. Meanwhile, when the priority of the general region is lower than the priority of the carpeted region, the robot vacuum cleaner 1000 may plan a third cleaning route 1003 of moving to the general region after completing the cleaning of the carpeted region. According to the third cleaning route 1003, the robot vacuum cleaner 1000 may operate in the carpet cleaning mode 1010 having the second suction force in the carpeted region, and may operate in the general cleaning mode 1020 having the first suction force lower than the second suction force in the general region.

Figure 11:
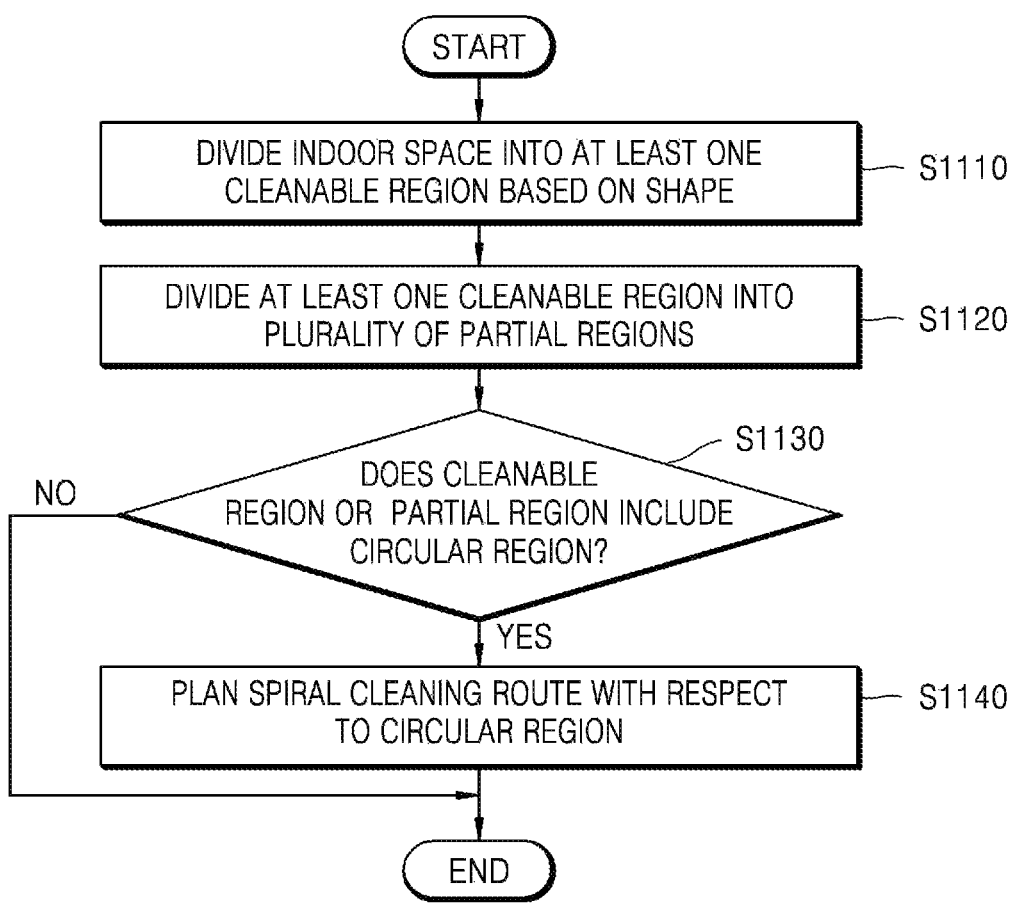
FIG. 11 is a flowchart illustrating an example method of planning a cleaning route with respect to a circular region, according to an embodiment of the disclosure.

FIG. 11 is a flowchart illustrating an example method of planning a cleaning route with respect to a circular region, according to an embodiment of the disclosure.

In operation S1110, the robot vacuum cleaner 1000 may divide an indoor space into at least one cleanable region based on a shape.

Figure 12:
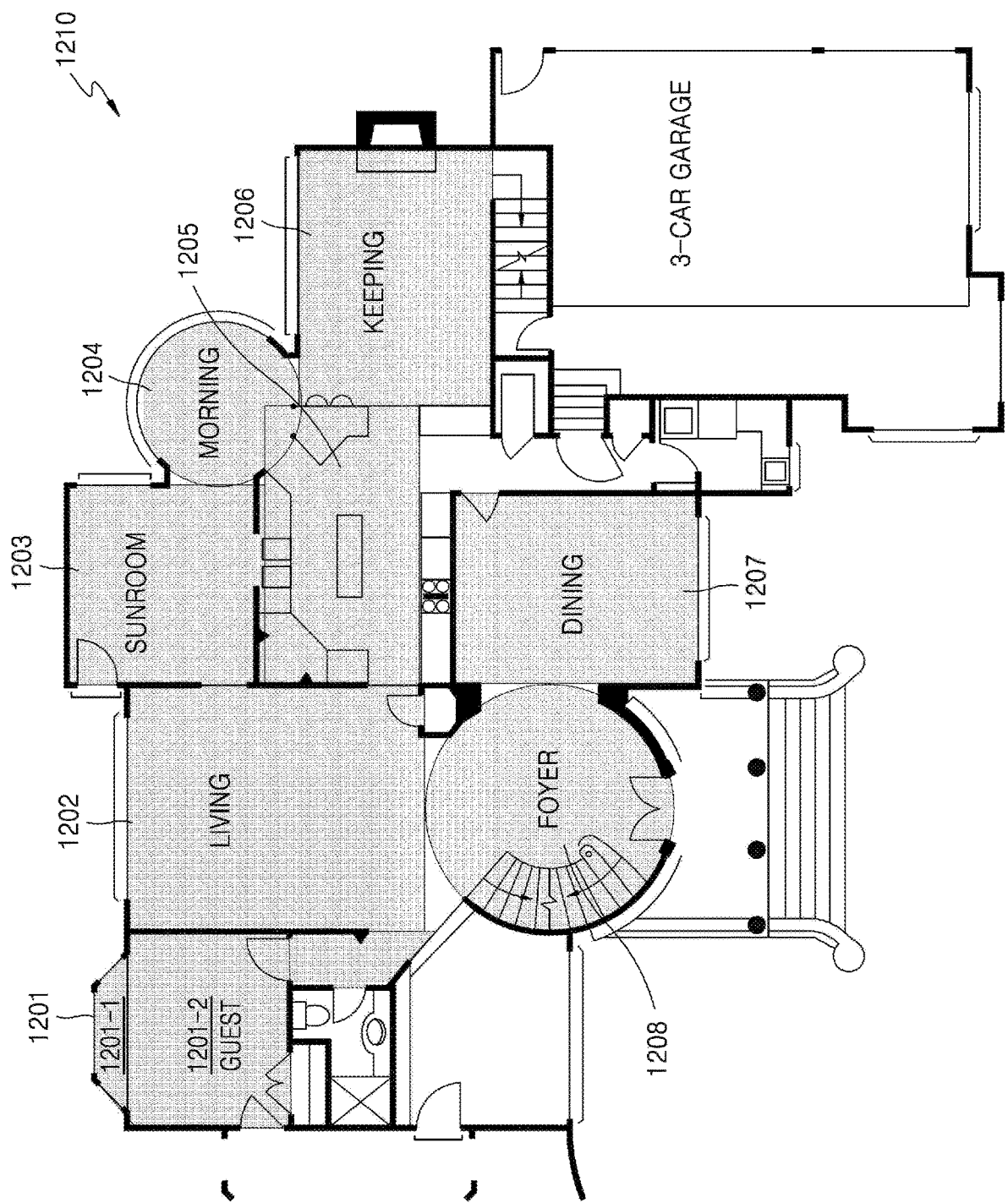
FIG. 12 is a diagram illustrating an example operation by which a robot vacuum cleaner divides an indoor space into a plurality of cleanable regions based on shape, according to an embodiment of the disclosure.

According to an example embodiment of the disclosure, the robot vacuum cleaner 1000 may divide the indoor space into a circular region, a rectangular region, a trapezoidal region, and the like, but embodiments of the disclosure are not limited thereto. For example, referring to FIG. 12, the robot vacuum cleaner 1000 may use an indoor space map 1210 to divide an indoor space, in which the robot vacuum cleaner 1000 is capable of moving, into a trapezoidal region 1201, rectangular regions 1202, 1203, 1205, 1206, and 1207, and first and second circular regions 1204 and 1208.

In operation S1120, the robot vacuum cleaner 1000 may divide at least one cleanable region into a plurality of partial regions. For example, referring to FIG. 12, the robot vacuum cleaner 1000 may subdivide the trapezoidal region 1201 into regions 1201-1 and 1201-2. Because operation S1120 corresponds to operation S220 of FIG. 2, a detailed description thereof may not be repeated here.

In operation S1130, the robot vacuum cleaner 1000 may determine whether the cleanable region or the partial region includes a circular region.

According to an example embodiment of the disclosure, the robot vacuum cleaner 1000 may extract the circular region among the cleanable region and the partial regions. For example, referring to FIG. 12, the robot vacuum cleaner 1000 may extract the first circular region 1204 and the second circular region 1208 among the cleanable regions.

According to an example embodiment of the disclosure, the circular region may include an elliptical region and may also include a region having a shape close to a circle, but embodiments of the disclosure are not limited thereto.

In operation S1140, when the cleanable region or the partial region includes the circular region, the robot vacuum cleaner 1000 may plan a spiral cleaning route with respect to the circular region.

Figure 13:
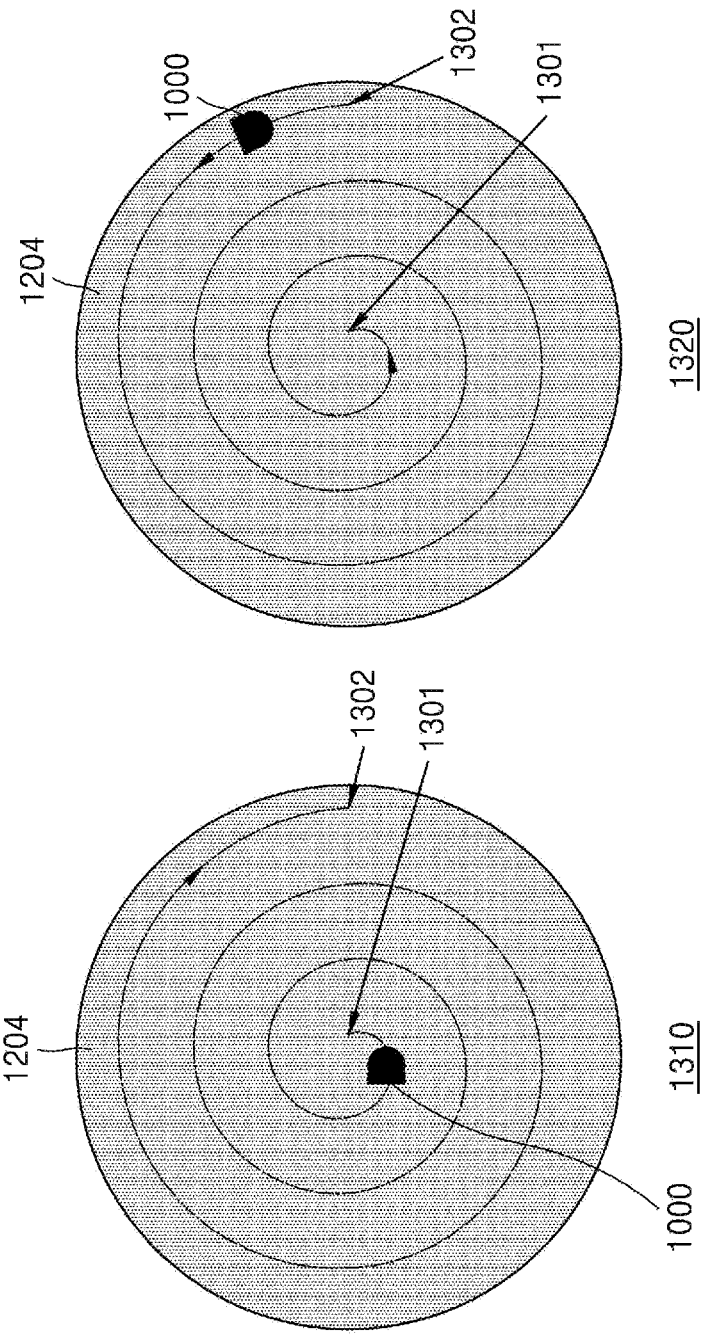
FIG. 13 is a diagram illustrating an example operation by which a robot vacuum cleaner plans a spiral cleaning route with respect to a circular region, according to an embodiment of the disclosure.

For example, referring to 1310 of FIG. 13, the robot vacuum cleaner 1000 may plan a spiral first cleaning route, in which a point 1301 is a start point and a point 1302 is an arrival (e.g., end) point, with respect to the first circular region 1204. That is, the first cleaning route may be a route that starts from the center of the circle and moves to the outside of the circle.

In addition, referring to 1320 of FIG. 13, the robot vacuum cleaner 1000 may plan a spiral second cleaning route, in which the point 1302 is a start point and the point 1301 is an arrival (e.g., end) point, with respect to the first circular region 1204. That is, the second cleaning route may be a route that starts from the outside of the circle and moves to the center of the circle.

According to an example embodiment of the disclosure, the robot vacuum cleaner 1000 may select one of the first cleaning route and the second cleaning route with respect to the first circular region 1204, based on at least one of current position information or information about a region to be moved next. However, embodiments of the disclosure are not limited thereto.

According to an example embodiment of the disclosure, when the robot vacuum cleaner 1000 plans the spiral cleaning route with respect to the circular region, the robot vacuum cleaner 1000 may perform fine cleaning with respect to the circular region.

FIG. 14 is a diagram illustrating an example operation by which the robot vacuum cleaner 1000 plans a cleaning route based on a precise mode, according to an embodiment of the disclosure.

A general robot vacuum cleaner may plan a first cleaning route 1401 of changing a direction when part of a bumper comes into contact with a wall. Therefore, according to the first cleaning route 1401, a wall portion may not be precisely cleaned with respect to a trapezoidal partial region 1201-1.

However, the robot vacuum cleaner 1000 according to an example embodiment of the disclosure may plan a second cleaning route 1402 to maximize and/or increase a portion in which the bumper and the wall come into contact with each other. For example, the robot vacuum cleaner 1000 may detect the wall using an infrared sensor (or a bumper sensor) and plan the second cleaning route 1402 to move along an edge at which the wall and the floor meet. Therefore, according to the second cleaning route, the wall portion may be precisely cleaned even with respect to the trapezoidal partial region 1201-1.

Figure 15:
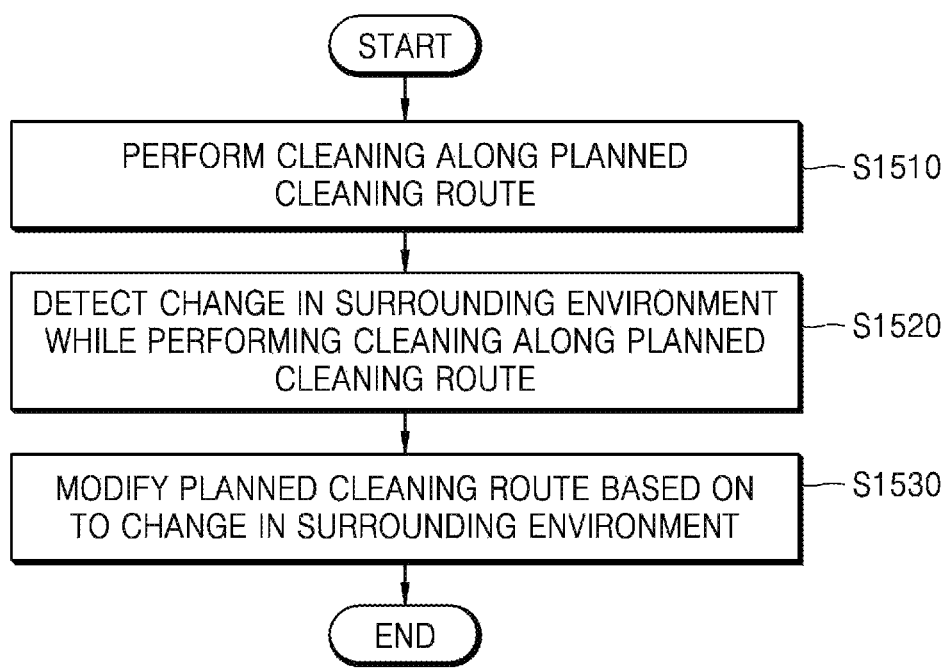
FIG. 15 is a flowchart illustrating an example method by which a robot vacuum cleaner modifies a planned cleaning route based on a change in a surrounding environment, according to an embodiment of the disclosure.

FIG. 15 is a flowchart illustrating an example method by which the robot vacuum cleaner 1000 modifies a planned cleaning route based on a change in a surrounding environment, according to an embodiment of the disclosure.

In operation S1510, the robot vacuum cleaner 1000 may perform cleaning along the planned cleaning route. For example, the robot vacuum cleaner 1000 may perform cleaning along a first cleaning route when a cleaning mode is a quick mode, and may perform cleaning along a second cleaning route when the cleaning mode is a precise mode.

Because operation S1510 corresponds to operation S350 of FIG. 3, a detailed description thereof may not be repeated here.

In operation S1520, the robot vacuum cleaner 1000 may detect a change in a surrounding environment while performing cleaning along the planned cleaning route.

According to an example embodiment of the disclosure, the robot vacuum cleaner 1000 may detect the change in a surrounding environment by comparing surrounding environment information detected by at least one sensor with surrounding environment information of an indoor space map. For example, the robot vacuum cleaner 1000 may detect a change in a position of furniture or a change in a position of a carpet. In addition, the robot vacuum cleaner 1000 may detect a new obstacle such as installation of a temporary wall or installation of new furniture.

In operation S1530, the robot vacuum cleaner 1000 may modify the planned cleaning route based on the change in a surrounding environment.

According to an example embodiment of the disclosure, when the robot vacuum cleaner 1000 detects an obstacle while performing cleaning along a first line included in the planned cleaning route, the robot vacuum cleaner 1000 may determine whether the robot vacuum cleaner 1000 is capable of passing through the obstacle. When the robot vacuum cleaner 1000 is not able to pass through the obstacle, the robot vacuum cleaner 1000 may modify the planned cleaning route to move to a second line adjacent to the first line. In addition, when the robot vacuum cleaner 1000 is not able to pass through the obstacle, the robot vacuum cleaner 1000 may newly divide at least one cleanable region into a plurality of partial regions and re-plan cleaning routes with respect to the newly divided partial regions according to the cleaning mode of the robot vacuum cleaner 1000.

According to an example embodiment of the disclosure, when there is an obstacle, such as a play mat or a carpet, through which the robot vacuum cleaner 1000 is capable of passing, the robot vacuum cleaner 1000 may re-divide the cleanable region and plan a new cleaning route in consideration of the position of the play mat or the carpet.

An operation by which the robot vacuum cleaner 1000 modifies the planned cleaning route will be described in greater detail below with reference to FIGS. 16, 17 and 18.

Figure 16:
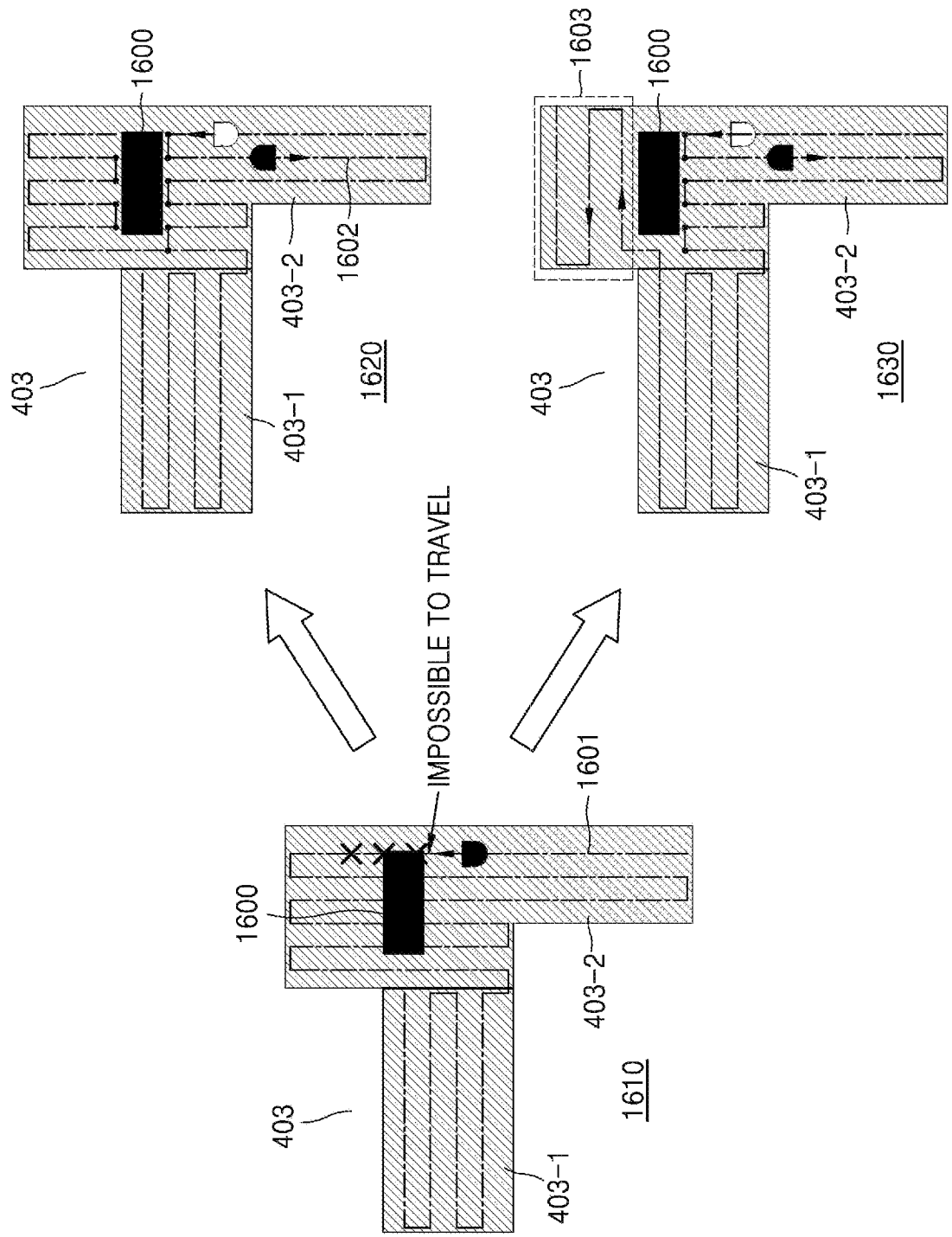
FIG. 16 is a diagram illustrating an example operation by which a robot vacuum cleaner modifies a planned cleaning route when an obstacle is detected, according to an embodiment of the disclosure.

FIG. 16 is a diagram illustrating an example operation by which the robot vacuum cleaner 1000 modifies a planned cleaning route when an obstacle is detected, according to an embodiment of the disclosure.

Referring to FIG. 16, the robot vacuum cleaner 1000 may plan a first cleaning route 1610 with respect to a study region 403 based on an indoor space map. The robot vacuum cleaner 1000 may clean the study region 403 along the first cleaning route 1610. The robot vacuum cleaner 1000 may detect an obstacle 1600 (for example, a desk) while moving along a first line 1601 included in the first cleaning route 1610. When the robot vacuum cleaner 1000 is not able to pass through the obstacle 1600, the robot vacuum cleaner 1000 does not further travel along the first line 1601, and thus, the robot vacuum cleaner 1000 may modify the first cleaning route 1610 to a second cleaning route 1620 or a third cleaning route 1630.

According to the second cleaning route 1620, because the robot vacuum cleaner 1000 no longer travels along the first line 1601 due to the obstacle 1600, the robot vacuum cleaner 1000 may move to a second line 1602 adjacent to the first line 1601 and perform cleaning. According to the second cleaning route 1620, the robot vacuum cleaner 1000 may maintain a route along which the robot vacuum cleaner 1000 moves in zigzag in a vertical direction with respect to a partial region 403-2.

Meanwhile, when the cleaning mode of the robot vacuum cleaner 1000 is a quick mode, the robot vacuum cleaner 1000 may modify the first cleaning route 1610 to the third cleaning route 1630 along which the robot vacuum cleaner 1000 moves in zigzag in a horizontal direction, instead of the route along which the robot vacuum cleaner 1000 moves in zigzag in a vertical direction with respect to an upper region 1603 of the obstacle 1600 in the partial region 403-2. The third cleaning route 1630 may enable quick cleaning because the third cleaning route 1630 reduces the number of direction changes for the upper region 1603 of the obstacle 1600, as compared with the second cleaning route 1620.

Figure 17:
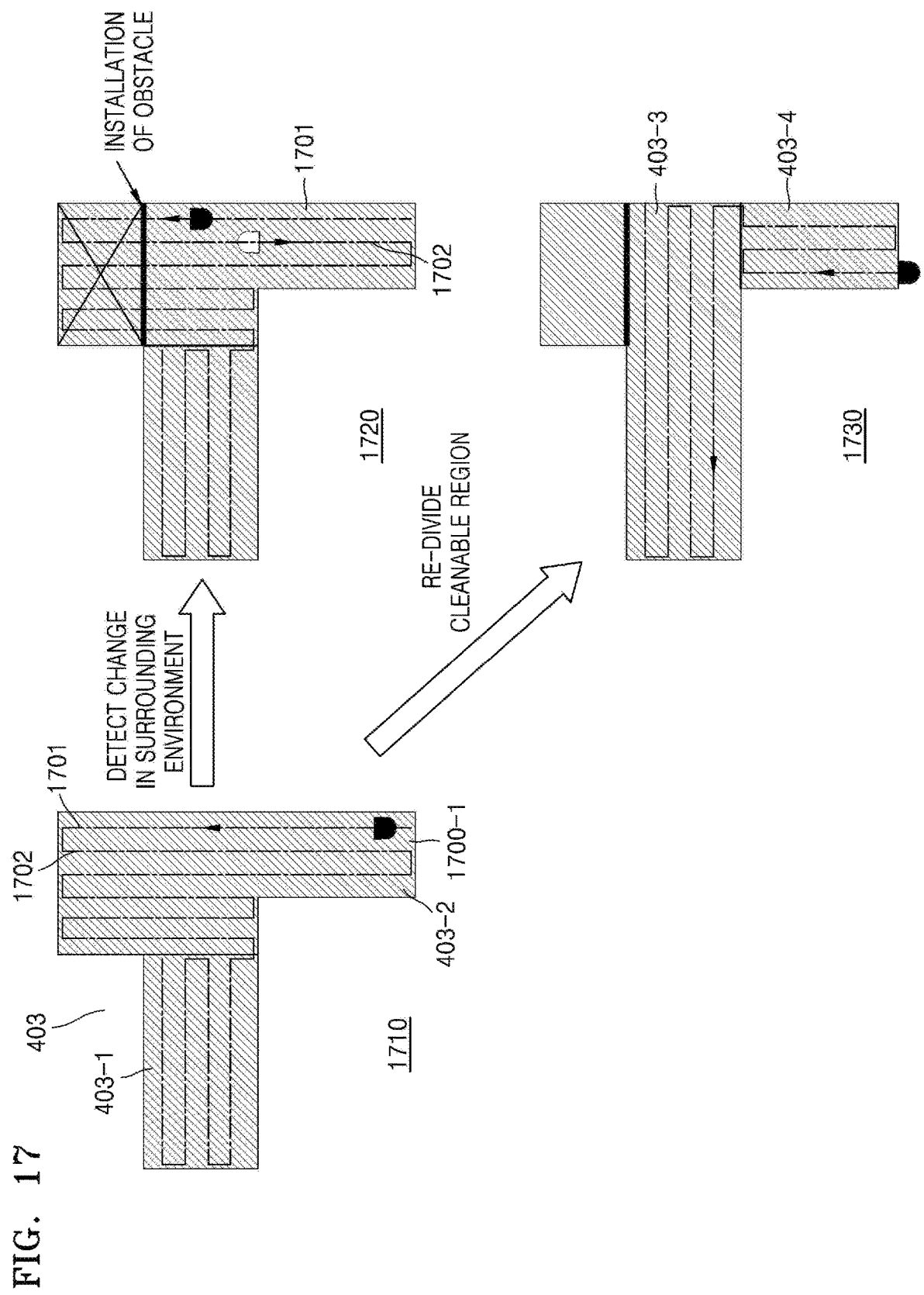
FIG. 17 is a diagram illustrating an example operation by which a robot vacuum cleaner re-divides a cleanable region based on a change in a surrounding environment, according to an embodiment of the disclosure.

FIG. 17 is a diagram illustrating an example operation by which the robot vacuum cleaner 1000 re-divides a cleanable region based on a change in a surrounding environment, according to an embodiment of the disclosure.

Referring to FIG. 17, the robot vacuum cleaner 1000 may plan a first cleaning route 1710 with respect to a study region 403 based on an indoor space map. The robot vacuum cleaner 1000 may clean the study region 403 along the first cleaning route 1710. The robot vacuum cleaner 1000 may detect an obstacle (for example, a temporary wall) while moving along a first line 1701 included in the first cleaning route 1710. When the robot vacuum cleaner 1000 is not able to pass through the obstacle, the robot vacuum cleaner 1000 does not further travel along the first line 1701, and thus, the robot vacuum cleaner 1000 may modify the first cleaning route 1710 to a second cleaning route 1720. According to the second cleaning route 1720, because the robot vacuum cleaner 1000 no longer travels along the first line 1701 due to the obstacle, the robot vacuum cleaner 1000 may move to a second line 1702 adjacent to the first line 1701 and perform cleaning. According to the second cleaning route 1720, the robot vacuum cleaner 1000 may maintain a route along which the robot vacuum cleaner 1000 moves in zigzag in a vertical direction with respect to a partial region 403-2.

According to another embodiment of the disclosure, the robot vacuum cleaner 1000 may newly divide the study region 403 into regions 403-3 and 403-4 instead of regions 403-1 and 403-2 based on the cleaning mode (for example, the quick mode). The robot vacuum cleaner 1000 may plan a third cleaning route 1730 with respect to the regions 403-3 and 403-4 based on the cleaning mode (for example, the quick mode). The third cleaning route 1730 may enable quick cleaning because the third cleaning route 1730 reduces the number of direction changes for the robot vacuum cleaner 1000, as compared with the second cleaning route 1720.

Figure 18:
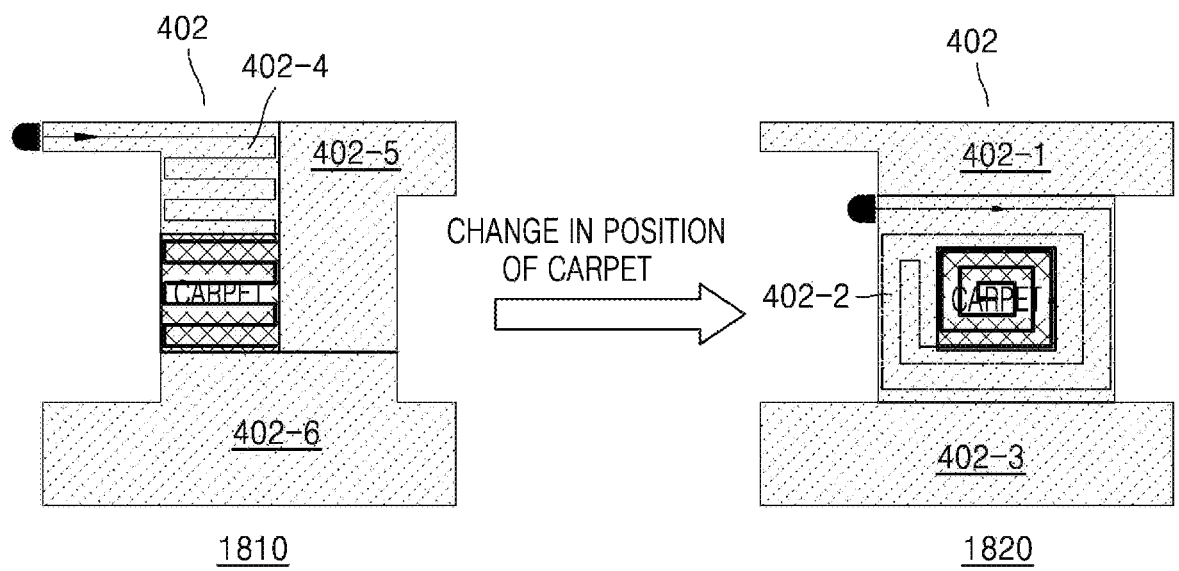
FIG. 18 is a diagram illustrating an example operation by which a robot vacuum cleaner re-divides a cleanable region based on a position of a carpet, according to an embodiment of the disclosure.

FIG. 18 is a diagram illustrating an example operation by which the robot vacuum cleaner 1000 re-divides a cleanable region according to a position of a carpet, according to an embodiment of the disclosure.

Referring to FIG. 18, when a carpet is positioned to the left of a living room region 402, the robot vacuum cleaner 1000 may divide a living room region 402 into regions 402-4, 402-5, and 402-6. The robot vacuum cleaner 1000 may divide the region 402-4 into a carpeted region and a remaining general region. After the robot vacuum cleaner 1000 completes the cleaning of the general region in the general cleaning mode 1020, the robot vacuum cleaner 1000 may plan a first cleaning route 1810 to enter the carpeted region and change the general cleaning mode 1020 to a carpet cleaning mode 1010.

Meanwhile, when the position of the carpet moves to the center of the living room region 402, the robot vacuum cleaner 1000 may detect a change in the position of the carpet using at least one sensor. The robot vacuum cleaner 1000 may newly divide the living room region 402 into regions 402-1, 402-2, and 402-3 based on the changed position of the carpet. The robot vacuum cleaner 1000 may divide the region 402-2 into a carpeted region and a remaining general region. After the robot vacuum cleaner 1000 completes the cleaning of the general region in the general cleaning mode 1020, the robot vacuum cleaner 1000 may plan a second cleaning route 1820 to enter the carpeted region and change the general cleaning mode 1020 to the carpet cleaning mode 1010.

Figure 19:
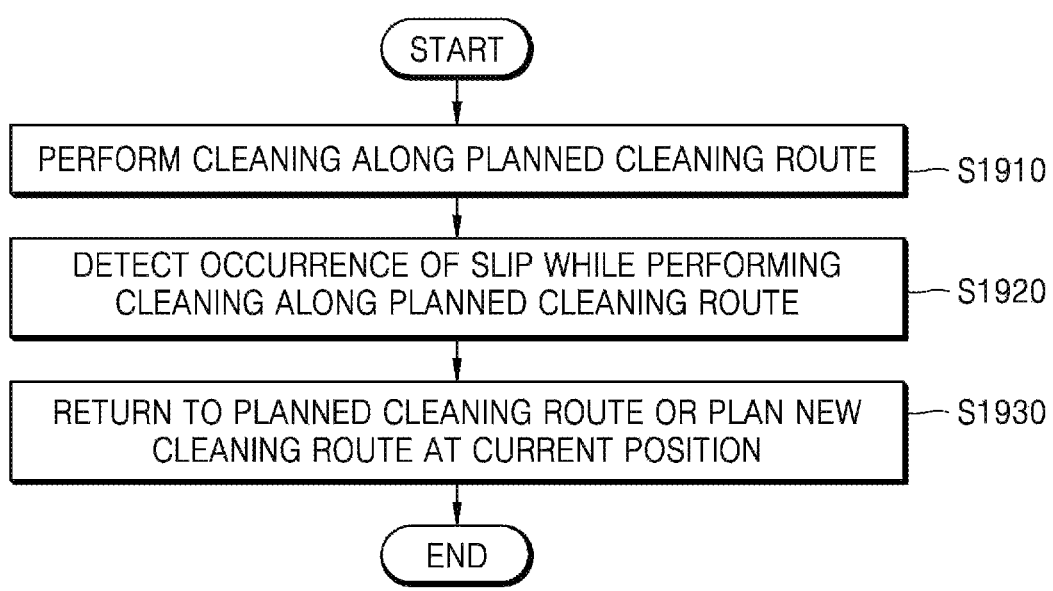
FIG. 19 is a flowchart illustrating an example method by which a robot vacuum cleaner plans a cleaning route when a slip occurs, according to an embodiment of the disclosure.

FIG. 19 is a flowchart illustrating an example method by which the robot vacuum cleaner 1000 plans a cleaning route when a slip occurs, according to an embodiment of the disclosure.

In operation S1910, the robot vacuum cleaner 1000 may perform cleaning along a planned cleaning route. For example, the robot vacuum cleaner 1000 may perform cleaning along a first cleaning route when a cleaning mode is a quick mode, and may perform cleaning along a second cleaning route when the cleaning mode is a precise mode.

Because operation S1910 corresponds to operation S350 of FIG. 3, a detailed description thereof may not be repeated here.

In operation S1920, the robot vacuum cleaner 1000 may detect occurrence of slip while performing cleaning along the planned cleaning route. The slip may refer, for example, to a phenomenon in which the robot vacuum cleaner 1000 unexpectedly deviates from the planned cleaning route due to slipping or the like. For example, due to the slip occurring while moving along a first line included in the planned cleaning route, the robot vacuum cleaner 1000 may move to a second line adjacent to the first line.

In operation S1930, the robot vacuum cleaner 1000 may return to the planned cleaning route or plan a new cleaning route at a current position.

According to an example embodiment of the disclosure, the robot vacuum cleaner 1000 may return to the planned cleaning route or plan a new cleaning route at a current position, based on at least one of current position information (for example, a distance from the current position to the planned cleaning route) or information about a region to be moved next. For example, when the robot vacuum cleaner 1000 does not deviate greatly from the planned cleaning route, the robot vacuum cleaner 1000 may return to the planned cleaning route and continue cleaning. When the robot vacuum cleaner 1000 deviates greatly from the planned cleaning route, the robot vacuum cleaner 1000 may plan the new cleaning route at the current position.

According to another embodiment of the disclosure, the robot vacuum cleaner 1000 may return to the planned cleaning route or plan a new cleaning route at a current position, based on the cleaning mode of the robot vacuum cleaner 1000. For example, when the cleaning mode is the quick mode, the robot vacuum cleaner 1000 may plan a first cleaning route to shorten the cleaning time at the current position.

Figure 20:
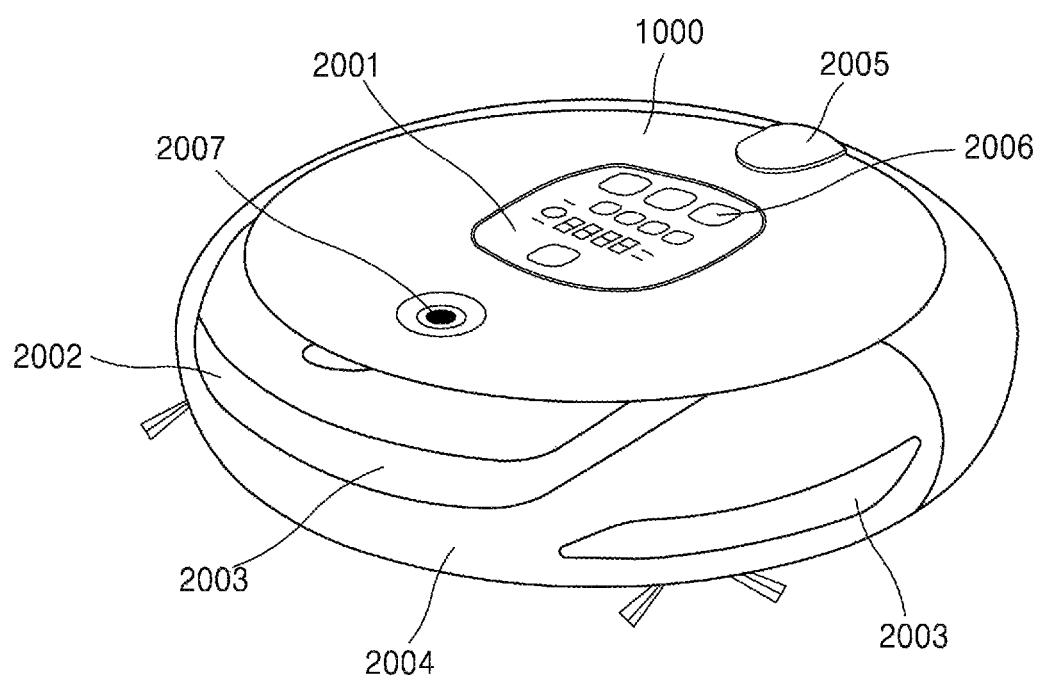
FIG. 20 is a diagram illustrating an example of the front structure of the robot vacuum cleaner, according to an embodiment of the disclosure.

FIG. 20 is a diagram illustrating an example of a front structure of the robot vacuum cleaner 1000, according to an embodiment of the disclosure.

Referring to FIG. 20, the robot vacuum cleaner 1000 may include a state display window 2001, a remote control receiver 2002, an obstacle sensor 2003, a bumper sensor 2004, a dust outlet 2005, an operation button 2006, a camera 2007, and the like, but embodiments of the disclosure are not limited thereto.

The state display window 2001 may display a current state (cleaning or charging), a remaining battery level, a current cleaning mode (for example, a quick mode, a precise mode, a carpet cleaning mode, or the like), and the like, but embodiments of the disclosure are not limited thereto.

According to an example embodiment of the disclosure, a user may use the operation button 2006 to change the cleaning mode (for example, the quick mode or the precise mode) of the robot vacuum cleaner 1000. In addition, the user may use the operation button 2006 to set a cleaning region or designate a cleaning mode for a specific region.

Figure 21:
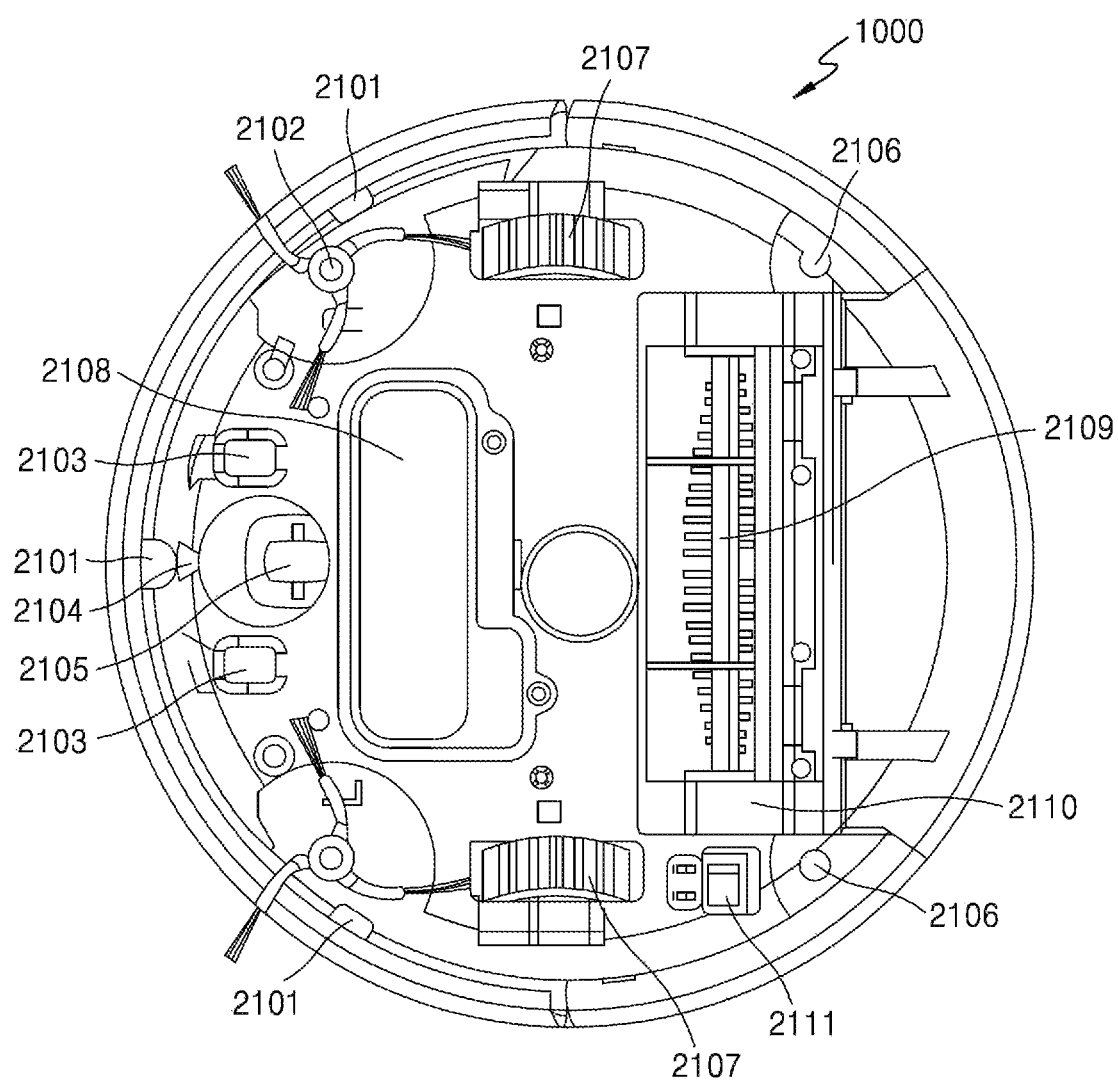
FIG. 21 is a diagram illustrating an example bottom structure of the robot vacuum cleaner, according to an embodiment of the disclosure.

FIG. 21 is a diagram illustrating an example of a bottom structure of the robot vacuum cleaner 1000, according to an embodiment of the disclosure.

Referring to FIG. 21, the robot vacuum cleaner 1000 may include a fall prevention sensor 2101, a side rotation brush 2102, a charging pin 2103, an entry prevention tape sensor 2104, a roller 2105, a mop plate removal port 2106, a driving wheel 2107, a battery cover 2108, a power brush 2109, a power brush cover 2110, and an emergency switch 2111, but embodiments of the disclosure are not limited thereto. Because the functions of the respective elements may be intuitively inferred from their names, detailed descriptions thereof may not be provided here.

Figure 22:
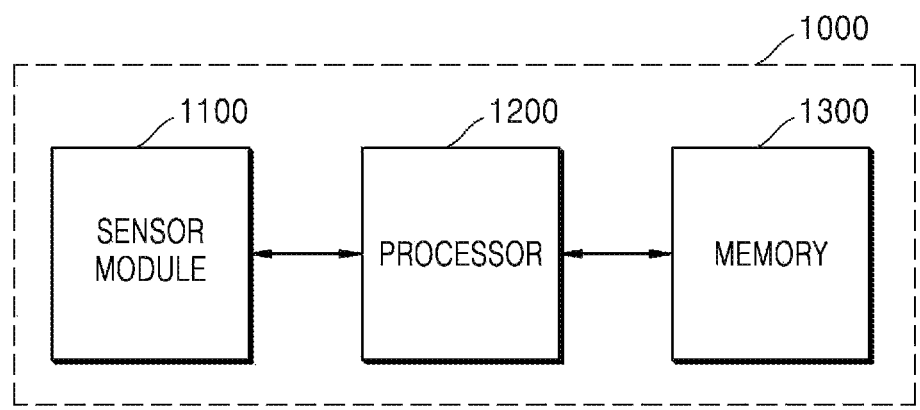
FIG. 22 is a block diagram illustrating an example configuration of the robot vacuum cleaner, according to an embodiment of the disclosure.

FIG. 22 is a block diagram illustrating an example configuration of the robot vacuum cleaner 1000, according to an embodiment of the disclosure.

Referring to FIG. 22, the robot vacuum cleaner 1000 may include a sensor module 1100, a processor (e.g., including processing circuitry) 1200, and a memory 1300. However, all elements illustrated in FIG. 22 are not essential to the robot vacuum cleaner 1000. The robot vacuum cleaner 1000 may be implemented with more elements than those illustrated in FIG. 22, or may be implemented with less elements than those illustrated in FIG. 22.

Figure 23:
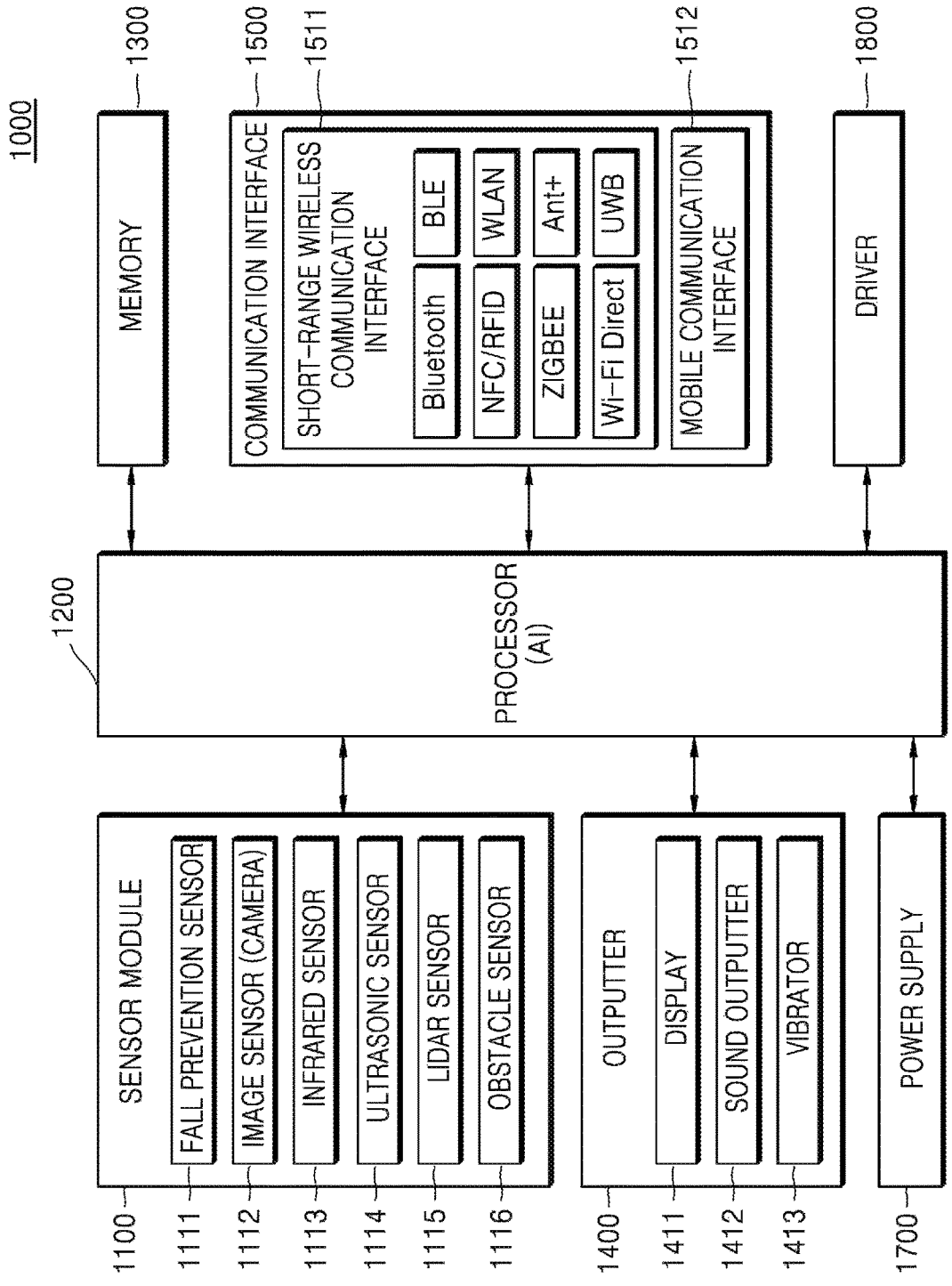
FIG. 23 is a block diagram illustrating an example configuration of the robot vacuum cleaner, according to an embodiment of the disclosure.

FIG. 23 is a block diagram illustrating an example configuration of the robot vacuum cleaner 1000, according to an embodiment of the disclosure. For example, as illustrated in FIG. 23, the robot vacuum cleaner 1000 may further include, in addition to the sensor module 1100, the processor 1200, and the memory 1300, an outputter (e.g., including output circuitry) 1400, a communicator (e.g., including communication circuitry) 1500, a driver 1800, and a power supply 1700. The respective elements will be described below.

The sensor module 1100 may include, for example, a plurality of sensors configured to detect information about an environment around the robot vacuum cleaner 1000. For example, the sensor module 1100 may include a fall prevention sensor 1111, an image sensor (e.g., a camera) 1112 (for example, a stereo camera, a mono camera, a wide angle camera, an around view camera, a three-dimensional (3D) vision sensor, etc.), an infrared sensor 1113, an ultrasonic sensor 1114, a lidar sensor 1115, an obstacle sensor 1116, a mileage sensor (not illustrated), and the like, but embodiments of the disclosure are not limited thereto. The mileage sensor may include a rotation detection sensor configured to calculate a rotation speed of a wheel. For example, the rotation detection sensor may be an encoder provided to detect a rotation speed of a motor. Because the functions of the respective sensors may be intuitively inferred from their names, detailed descriptions thereof may not be provided here.

According to an example embodiment of the disclosure, the sensor module 1100 may be used to generate an indoor space map. For example, the robot vacuum cleaner 1000 may generate the indoor space map using at least one of the camera 1112, the ultrasonic sensor 1114, or the lidar sensor 1115.

The processor 1200 may include various processing circuitry and control the overall operation of the robot vacuum cleaner 1000. The processor 1200 may control the sensor module 1100, the outputter 1400, the communicator 1500, the driver 1800, and the power supply 1700 by executing programs stored in a storage 160.

According to an example embodiment of the disclosure, the processor 1200 may include an artificial intelligence (AI) processor. In this case, the AI processor may divide at least one cleanable region into a plurality of partial regions according to a cleaning mode using a learning network model of an AI system. The AI processor may also plan a cleaning route according to a cleaning mode.

The AI processor may be manufactured in the form of a dedicated hardware chip for AI, or may be manufactured as part of an existing general-purpose processor (for example, a CPU or an application processor) or a dedicated graphics processor (for example, a GPU), and may be mounted on the robot vacuum cleaner 1000.

The processor 1200 may be responsible for cleaning driving such as determining the moving direction of the robot vacuum cleaner 1000, position recognition, and automatic charging of a battery. For example, the processor 1200 may perform a control so that the battery waits in a state of being connected to an external charging device when the battery is not in operation, thereby maintaining a battery level within a predetermined range. When a charge request and a signal are input from a battery level detector at the time of operation completion or during operation, the processor 1200 may control the driver 1800 to return to the external charging device.

According to an example embodiment of the disclosure, the processor 1200 may divide the indoor space into at least one cleanable region based on the indoor space map. The processor 1200 may divide at least one cleanable region into a plurality of partial regions according to the cleaning mode of the robot vacuum cleaner 1000. The processor 1200 may plan cleaning routes for the plurality of partial regions according to the cleaning mode. For example, when the cleaning mode is a first mode, the processor 1200 may plan a first cleaning route to minimize and/or reduce the number of direction changes of the robot vacuum cleaner 1000 with respect to each of the partial regions, and when the cleaning mode is a second mode, the processor 1200 may plan a second cleaning route to maximize and/or increase the number of direction changes of the robot vacuum cleaner 1000 with respect to each of the partial regions. In this case, the first mode (quick mode) may be a mode in which the cleaning time is shortened, as compared with the second mode (precise mode). According to an example embodiment of the disclosure, when the cleaning mode is the second mode (precise mode), the processor 1200 may plan the second cleaning route to maximize and/or increase the area where the bumper of the robot vacuum cleaner 1000 comes into contact with the wall.

According to an example embodiment of the disclosure, the processor 1200 may divide the indoor space into at least one cleanable region based, for example, on the purpose or the shape.

According to an example embodiment of the disclosure, the processor 1200 may determine one of the first mode (quick mode) and the second mode (precise mode) as the cleaning mode of the robot vacuum cleaner 1000, based on the user input or the purpose of at least one cleanable region.

According to an example embodiment of the disclosure, the processor 1200 may divide at least one cleanable region into a first partial region and a second partial region based on a material of a floor. The processor 1200 may determine the priorities of the first partial region and the second partial region. Based on the priorities, the processor 1200 may plan a cleaning route to move to the second partial region after the cleaning of the first partial region is completed, or may plan a cleaning route to move to the first partial region after the cleaning of the second partial region is completed.

According to an example embodiment of the disclosure, when the partial regions include a circular region, the processor 1200 may plan a spiral cleaning route with respect to the circular region.

According to an example embodiment of the disclosure, the processor 1200 may perform cleaning along the planned cleaning route selected from the first cleaning route and the second cleaning route. The processor 1200 may detect an obstacle while performing cleaning along the first line included in the planned cleaning route. When the robot vacuum cleaner 1000 is not able to pass through the obstacle, the processor 1200 may modify the planned cleaning route to move to the second line adjacent to the first line.

The memory 1300 may store programs for processing and control of the processor 1200 and may store input or output data (for example, the indoor space map, the cleaning route, and the like). The memory 1300 may store an AI model.

The memory 1300 may include at least one storage medium selected, for example, and without limitation, from flash memory, hard disk, multimedia card micro type memory, card type memory (for example, SD or XD memory), random access memory (RAM), static random access memory (SRAM), read-only memory (ROM), electrically erasable programmable read-only memory (EEPROM), programmable read-only memory (PROM), magnetic memory, magnetic disk, optical disk, or the like. In addition, the robot vacuum cleaner 1000 may operate a web storage or a cloud server configured to a storage function on the Internet.

The outputter 1400 may include various output circuitry and output an audio signal, a video signal, or a vibration signal and may include a display 1411, a sound outputter (e.g., including sound output circuitry) 1412, and a vibrator (e.g., a vibration motor) 1413.

The display 1411 may display information that is processed in the robot vacuum cleaner 1000. For example, the display 1411 may display a current position of the robot vacuum cleaner 1000, may display a cleaning mode of the robot vacuum cleaner 1000, or may display a cleaning state (for example, a progress rate) and a charging state (for example, a remaining battery level), but embodiments of the disclosure are not limited thereto. The display 1411 may display a user interface (UI) or a graphic user interface (GUI) associated with a mode setting.

Meanwhile, when the display 1411 and a touch pad form a layered structure form a touch screen, the display 1411 may also be used as an input device as well as an output device. The display 1411 may include, for example, and without limitation, at least one selected from liquid crystal display (LCD), thin film transistor-liquid crystal display (TFT-LCD), organic light-emitting diode (OLED), flexible display, 3D display, electrophoretic display, or the like. The robot vacuum cleaner 1000 may include two or more displays 1411 according to the implementation form of the robot vacuum cleaner 1000.

According to an example embodiment of the disclosure, the display 1411 may include the state display window 2001 of FIG. 20. When the display 1411 is implemented as a touch screen, the display 1411 may further include the operation button 2006 of FIG. 20.

According to an example embodiment of the disclosure, the display 1411 may include a transparent display. The transparent display may be implemented, for example, and without limitation, as a transparent LCD type, a transparent thin-film electroluminescent panel (TFEL) type, a transparent OLED type, a projection type, or the like. The projection type may refer, for example, to a method of displaying an image by projecting the image on a transparent screen such as a head up display (HUD).

The sound outputter 1412 may include various sound output circuitry and output audio data received from the communicator 1500 or stored in the memory 1300. In addition, the sound outputter 1412 may output a sound signal associated with the function performed by the robot vacuum cleaner 1000. For example, the sound outputter 1412 may output a voice message notifying a user of completion of cleaning. The sound outputter 1412 may include various sound output circuitry, such as, for example, and without limitation, a speaker, a buzzer, or the like.

The vibrator 1413 may include, for example, a vibration motor and may output a vibration signal. For example, the vibrator 1230 may output a vibration signal corresponding to the output of audio data or video data (for example, a warning message or the like).

The communicator 1500 may include various communication circuitry and may include at least one antenna configured to wirelessly communicate with another device (for example, an external robot vacuum cleaner, the mobile device 100, or an external server). For example, the communicator 1500 may include one or more elements or circuitry configured to enable communication between the robot vacuum cleaner 1000 and the mobile device 100 or between the robot vacuum cleaner 1000 and the server. For example, the communicator 1500 may include a short-range wireless communication interface (e.g., including short-range wireless communication circuitry) 1511, a mobile communication interface (e.g., including mobile communication circuitry) 1512, and the like, but embodiments of the disclosure are not limited thereto.

The short-range wireless communication interface 1511 may include various short-range wireless communication circuitry, such as, for example, and without limitation, a Bluetooth communication interface, a BLE communicator, a near field communication/radio frequency identification interface (NFC/RFID), a WLAN (Wi-Fi) communication interface, a Zigbee communication interface, an IrDA communication interface (not shown), a Wi-Fi Direct (WFD) communication interface, a UWB communication interface, an Ant+ communication interface, or a microwave (uWave) communication interface (not shown), but embodiments of the disclosure are not limited thereto.

The mobile communication interface 1512 may include various mobile communication circuitry and transmit or receive a wireless signal with at least one selected from a base station, an external terminal, and a server via a mobile communication network. The wireless signal may include a voice call signal, a video call signal, or various types of data according to text or multimedia message transmission and reception.

The driver 1800 may include elements used for driving (operation) of the robot vacuum cleaner 1000 and operations of devices inside the robot vacuum cleaner 1000. The driver 1800 may include, for example, and without limitation, a suction part, a driving part, and the like, but embodiments of the disclosure are not limited thereto. The suction part functions to collect dust on the floor while suctioning air. The suction part may include a rotation brush or a broom, a rotation brush motor, an air suction port, a filter, a dust collecting chamber, an air discharge port, and the like, but embodiments of the disclosure are not limited thereto. The suction part may additionally be mounted in a structure in which a brush capable of sweeping out dust from a corner is rotated.

The driving part may include two front wheels on both sides of the front, two rear wheels on both sides of the rear, motors respectively configured to rotate and drive the two rear wheels, timing belts configured to transfer powers generated from the two rear wheels to the two front wheels, and the like, but embodiments of the disclosure are not limited thereto.

According to an example embodiment of the disclosure, the robot vacuum cleaner 1000 may include an inputter (not illustrated). The inputter may include various input circuitry and may refer, for example, to a device configured to input data for the user to control the robot vacuum cleaner 1000. For example, the inputter may include various input circuitry, such as, for example, and without limitation, a key pad, a dome switch, a touch pad (for example, a touch type capacitive touch pad, a pressure type resistive touch pad, an infrared beam sensing type touch pad, a surface acoustic wave type touch pad, an integral strain gauge type touch pad, a piezo effect type touch pad, or the like), a jog wheel, a jog switch, or the like, but an example embodiments of the disclosure are not limited thereto.

The method according to an example embodiment of the disclosure may be embodied as program commands that are executable by various computer devices and may be recorded on a non-transitory computer-readable recording medium. Examples of the computer-readable recording medium may include program commands, data files, and data structures alone or in combination. The program commands recorded on the computer-readable recording medium may be specially designed and configured for the disclosure, or may be known to and usable by those of ordinary skill in the field of computer software. Examples of the computer-readable recording medium may include magnetic media (e.g., hard disk, floppy disk, magnetic tape, etc.), optical media (e.g., compact disc-read-only memory (CD-ROM), digital versatile disc (DVD), etc.), magneto-optical media (e.g., floptical disk, etc.), and hardware devices (e.g., ROM, RAM, flash memory, etc.) specially configured to store and execute program commands. Examples of the program commands may include not only machine language codes produced by a compiler but also high-level language codes made by a compiler or executable by an interpreter or the like.

Embodiments of the disclosure may be embodied in the form of a computer-readable recording medium including computer-executable instructions such as computer-executable program modules. The computer-readable recording medium may be any available medium that is accessible by a computer and may include any volatile and non-volatile media and any removable and non-removable media. Furthermore, the computer-readable recording medium may include any computer storage medium and communication medium. The computer storage medium may include any volatile and non-volatile medium and any removable and non-removable medium embodied by any method or technology for storing information such as computer-readable instructions, data structures, program modules, or other data. The communication medium may include computer-readable instructions, data structures, program modules, other data of modulated data signals such as carriers, or other transmission mechanisms, and may include any information transmission medium. Furthermore, embodiments of the disclosure may also be embodied as a computer program or a computer program product including computer-executable instructions such as a computer-executable program.

While various example embodiments of the disclosure have been illustrated and described, it will be understood by those of ordinary skill in the art that the scope of the disclosure is not limited thereto and various changes and modifications may be made therein without departing from the scope of the disclosure, including the following claims.

What is claimed is:

1. A method, performed by a robot vacuum cleaner, including planning a cleaning route, the method comprising:
   obtaining a user input to determine a cleaning mode of the robot vacuum cleaner;
   dividing an indoor space into at least one cleanable region based on an indoor space map generated using at least one sensor included in the robot vacuum cleaner;
   in case of the cleaning mode determined based on the user input is a first mode, dividing the at least one cleanable region into a plurality of first partial regions determined based on a material of the at least one cleanable region and being capable of planning a cleaning route in which a distance of a continuous straight section is increased and a number of direction changes is decreased in the plurality of first partial regions and in case of the cleaning mode determined based on the user input is a second mode, dividing the at least one cleanable region into a plurality of second partial regions determined based on a material of the at least one cleanable region and being capable of planning a cleaning route in which a distance of a continuous straight section is decreased and a number of direction changes is increased in the plurality of second partial regions;
   for each of the plurality of first or second partial regions, comparing an amount of at least one of dust or a contamination level with a threshold value;
   in case of the amount of at least one of dust or the contamination level for at least one first partial region of the plurality of first or second partial regions is equal to or less than the threshold value, according to the first mode, planning a first cleaning route to decrease a number of direction changes of the robot vacuum cleaner for the at least one first partial region; and
   in case of the amount of at least one of dust or the contamination level for at least one second partial region of the plurality of first or second partial regions is greater than the threshold value, according to the second mode, planning a second cleaning route to increase a number of direction changes of the robot vacuum cleaner, decrease a distance of a continuous straight section, and maximize an area where a bumper of the robot vacuum cleaner comes into contact with a wall for the at least one second partial region;
   wherein for the first cleaning route a cleaning time is shorter than a cleaning time of the second cleaning route.

2. The method of claim 1, wherein the dividing of the indoor space into the at least one cleanable region comprises dividing the indoor space into the at least one cleanable region based on at least one of a purpose or a shape.

3. The method of claim 1, further comprising:
   classifying the plurality of first or second partial regions into a first type of partial region and a second type of partial region;
   determining priorities of the first type of partial region and the second type of partial region; and
   planning a cleaning route to move to the second type of partial region after the cleaning of the first type of partial region is completed, or planning a cleaning route to move to the first type of partial region after the cleaning of the second type of partial region is completed based on the priorities.

4. The method of claim 3, wherein the first type of partial region includes a region in which a carpet is laid, and
the second type of partial region includes a remaining region in which the carpet is not laid.

5. The method of claim 1, further comprising, planning a spiral cleaning route with respect to a circular region based on the plurality of first or second partial regions including a circular region.

6. The method of claim 1, further comprising:
performing cleaning along a planned cleaning route selected from the first cleaning route and the second cleaning route;
detecting a change in a surrounding environment while performing the cleaning along the planned cleaning route; and
modifying the planned cleaning route based on the change in the surrounding environment.

7. The method of claim 6, wherein the modifying of the planned cleaning route based on the change in the surrounding environment comprises:
detecting an obstacle while performing cleaning along a first line included in the planned cleaning route; and
modifying the planned cleaning route to move to a second line adjacent to the first line based on the robot vacuum cleaner being unable to pass through the obstacle.

8. The method of claim 6, wherein the modifying of the planned cleaning route based on the change in the surrounding environment comprises:
detecting an obstacle while performing cleaning along a first line included in the planned cleaning route;
newly dividing the at least one cleanable region into a plurality of partial regions based on the robot vacuum cleaner being unable to pass through the obstacle; and
re-planning cleaning routes with respect to the plurality of newly divided partial regions based on the cleaning mode of the robot vacuum cleaner.

9. The method of claim 6, wherein the modifying of the planned cleaning route based on the change in the surrounding environment comprises, newly dividing the at least one cleanable region based on a current position of a carpet based on a position of the carpet placed on a floor being changed.

10. The method of claim 1, further comprising:
performing cleaning along a planned cleaning route selected from the first cleaning route and the second cleaning route; and
returning to the planned cleaning route or planning a new cleaning route at a current position based on the cleaning mode of the robot vacuum cleaner based on the robot vacuum cleaner deviating from the planned cleaning route due to a slip.

11. The method of claim 1, further comprising:
wherein in any one of the at least one cleanable region, the plurality of first partial regions divided based on the first mode and the plurality of second partial regions divided based on the second mode are different from each other.

12. A robot vacuum cleaner comprising:
a memory configured to store one or more instructions;
at least one sensor configured to generate an indoor space map; and
a processor connected to the at least one sensor,
wherein the processor is configured to execute the one or more instructions to control the robot vacuum cleaner to:
obtain a user input to determine a cleaning mode of the robot vacuum cleaner;
divide an indoor space into at least one cleanable region based on the indoor space map;
in case of the cleaning mode determined based on the user input is a first mode, divide the at least one cleanable region into a plurality of first partial regions determined based on a material of the at least one cleanable region and being capable of planning a cleaning route in which a distance of a continuous straight section is increased and a number of direction changes is decreased in the plurality of first partial regions and in case of the cleaning mode determined based on the user input is a second mode, divide the at least one cleanable region into a plurality of second partial regions determined based on a material of the at least one cleanable region and being capable of planning a cleaning route in which a distance of a continuous straight section is decreased and a number of direction changes is increased;
for each of the plurality of first or second partial regions, compare an amount of dust or a contamination level with a threshold value;
in case of the amount of dust or the contamination level for at least one first partial region of the plurality of first or second partial regions is equal to or less than the threshold value, according to the first mode, plan a first cleaning route that decrease a number of direction changes of the robot vacuum cleaner and increase a distance of a continuous straight section for the at least one first partial region; and
in case of the amount of dust or the contamination level for at least one second partial region of the plurality of first or second partial regions is greater than the threshold value, according to the second mode, plan a second cleaning route that increase a number of direction changes of the robot vacuum cleaner, decrease a distance of a continuous straight section, and increase an area where a bumper of the robot vacuum cleaner comes into contact with a wall for the at least one second partial region;
wherein the first cleaning route has a cleaning time that is shortened as compared with the cleaning time of the second cleaning route.

13. The robot vacuum cleaner of claim 12, wherein the processor is further configured to control the robot vacuum cleaner to divide the indoor space into the at least one cleanable region based on a purpose or a shape.

14. The robot vacuum cleaner of claim 12, wherein the processor is further configured to control the robot vacuum cleaner to:
classify the plurality of first or second partial regions into a first type of partial region and a second type of partial region;
determine priorities of the first type of partial region and the second type of partial region; and
plan a cleaning route to move to the second type of partial region after cleaning of the first type of partial region is completed, or plan a cleaning route to move to the first type of partial region after cleaning of the second type of partial region is completed based on the priorities.

15. The robot vacuum cleaner of claim 12, wherein in any one of the at least one cleanable region, the plurality of first partial regions divided based on the first mode and the plurality of second partial regions divided based on the second mode are different from each other.

16. A computer program product comprising a non-transitory computer-readable recording medium having recorded thereon a program which, when executed, causes a device to perform operations comprising:

obtaining a user input to determine a cleaning mode of a robot vacuum cleaner;

dividing an indoor space into at least one cleanable region based on an indoor space map generated using at least one sensor included in a robot vacuum cleaner;

in case of the cleaning mode determined based on the user input is a first mode, dividing the at least one cleanable region into a plurality of first partial regions determined based on a material of the at least one cleanable region and being capable of planning a cleaning route in which a distance of a continuous straight section is increased and a number of direction changes is in the plurality of first partial regions and in case of the cleaning mode determined based on the user input is a second mode, dividing the at least one cleanable region into a plurality of second partial regions determined based on a material of the at least one cleanable region and being capable of planning a cleaning route in which a distance of a continuous straight section is decreased and a number of direction changes is increased in the plurality of second partial regions;

for each of the plurality of first or second partial regions, comparing an amount of dust or a contamination level with a threshold value;

in case of the amount of dust or the contamination level for at least one first partial region of the plurality of first or second partial regions is equal to or less than the threshold value, according to the first mode, planning a first cleaning route that decrease a number of direction changes of the robot vacuum cleaner and increase a distance of a continuous straight section for the at least one first partial region; and in case of the amount of dust or the contamination level for at least one second partial region of the plurality of first or second partial regions is greater than the threshold value, according to the second mode, planning a second cleaning route that increase a number of direction changes of the robot vacuum cleaner, decrease a distance of a continuous straight section, and maximize an area where a bumper of the robot vacuum cleaner comes into contact with a wall for the at least one second partial region;

wherein the first cleaning route has a cleaning time is shorter than a cleaning time of the second cleaning route.

* * * * *